United States Patent
Nakajima et al.

(10) Patent No.: US 9,336,626 B2
(45) Date of Patent: May 10, 2016

(54) IMAGING APPARATUS CAPABLE OF GENERATING THREE-DIMENSIONAL IMAGES, THREE-DIMENSIONAL IMAGE GENERATING METHOD, AND RECORDING MEDIUM

(71) Applicant: CASIO COMPUTER CO., LTD., Shibuya-ku, Tokyo (JP)

(72) Inventors: Mitsuyasu Nakajima, Nishitamagun Mizuho-machi (JP); Keiichi Sakurai, Akishima (JP); Takashi Yamaya, Fussa (JP); Yuki Yoshihama, Inagi (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 116 days.

(21) Appl. No.: 14/224,590

(22) Filed: Mar. 25, 2014

(65) Prior Publication Data

US 2014/0204086 A1 Jul. 24, 2014

Related U.S. Application Data

(62) Division of application No. 13/161,645, filed on Jun. 16, 2011, now Pat. No. 8,817,075.

(30) Foreign Application Priority Data

Jun. 29, 2010 (JP) ................................ 2010-147924

(51) Int. Cl.
*H04N 13/00* (2006.01)
*G06K 9/00* (2006.01)
(Continued)

(52) U.S. Cl.
CPC ................. *G06T 17/00* (2013.01); *G06T 5/002* (2013.01); *G06T 7/0075* (2013.01); *H04N 5/213* (2013.01); *G06T 2200/08* (2013.01); *G06T 2207/10012* (2013.01); *H04N 2013/0081* (2013.01)

(58) Field of Classification Search
CPC ... G06T 17/00; G06T 7/0075; G06T 2200/08; G06T 2207/10012; G06T 19/20; G06T 17/05
USPC ........... 348/46, 50, 222.1; 345/419–420, 582; 382/154; 703/1
See application file for complete search history.

(56) References Cited

U.S. PATENT DOCUMENTS 5,113,137 A 5/1992 Koizumi et al.
6,476,803 B1 11/2002 Zhang et al.
(Continued)

FOREIGN PATENT DOCUMENTS

JP 9-231371 A 9/1997
JP 2010-122725 A 6/2010

OTHER PUBLICATIONS

English language translation of "Digital Image Processing", Yoichi Sato et al., edited by Digital Image Processing Editorial Committee, Published by Computer Graphic Arts (CG-ARTS) Society First Edition: Jul. 22, 2004, Second Edition (Second copy): Mar. 2, 2009; pp. 252-262.

(Continued)

*Primary Examiner* — Gims Philippe
(74) *Attorney, Agent, or Firm* — Holtz, Holtz & Volek PC

(57) ABSTRACT

An imaging apparatus generates a 3D model using a photographed image of a subject and generates a 3D image based on the 3D model. When a corresponding point corresponding to a point forming the 3D model does not form a 3D model generated using a photographed image photographed at a different photographing position, the imaging apparatus determines that the point is noise, and removes the point determined as noise from the 3D model. The imaging apparatus generates a 3D image based on the 3D model from which the point determined as noise is removed.

8 Claims, 14 Drawing Sheets

(51) Int. Cl.
  *G06T 17/00* (2006.01)
  *H04N 5/213* (2006.01)
  *G06T 5/00* (2006.01)
  *G06T 7/00* (2006.01)

(56) References Cited

U.S. PATENT DOCUMENTS 7,508,982 B2 3/2009 Tsuyuki et al.
7,995,054 B2 8/2011 Wheeler et al.
8,442,304 B2 5/2013 Marrion et al.

2011/0279697 A1* 11/2011 Shingu ................ H04N 5/2621
  348/222.1
2012/0256916 A1* 10/2012 Kitamura ................ G01S 17/89
  345/419
2013/0124149 A1* 5/2013 Carr ........................ G06F 17/50
  703/1

OTHER PUBLICATIONS

Japanese Office Action dated Jan. 4, 2012 (and English translation thereof) in counterpart Japanese Application No. 2010-147924.
"Digital Image Processing"; by Y. Sato; published by CG-ARTS Society, issued Nov. 2, 2009, pp. 251-262.

* cited by examiner

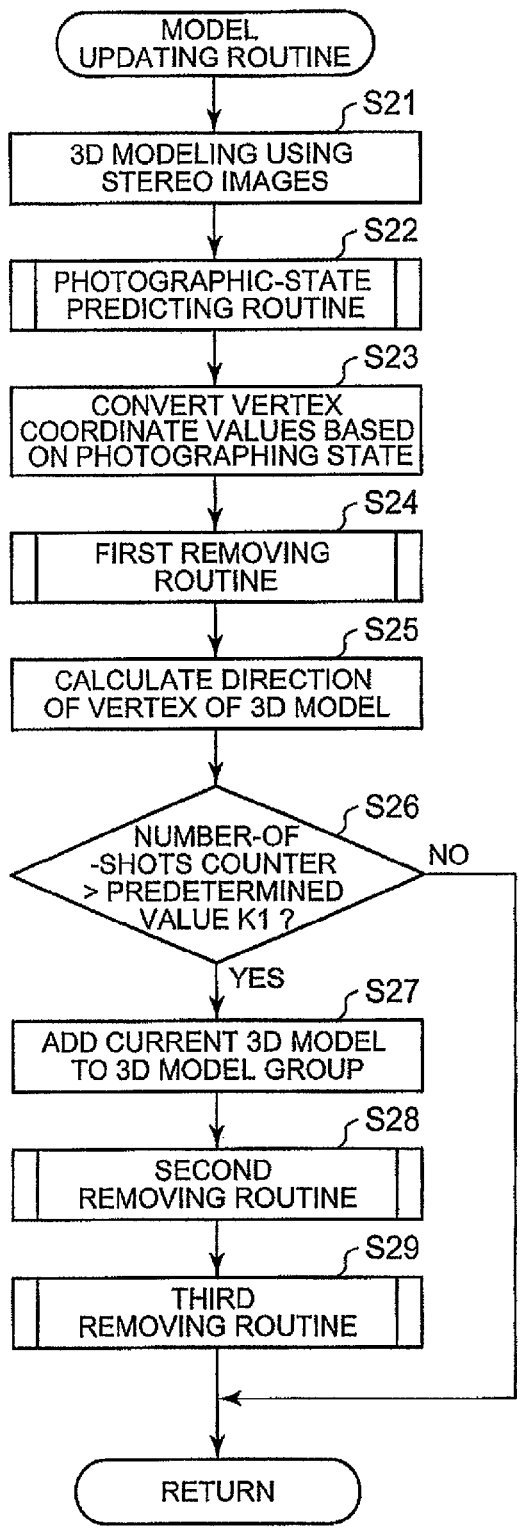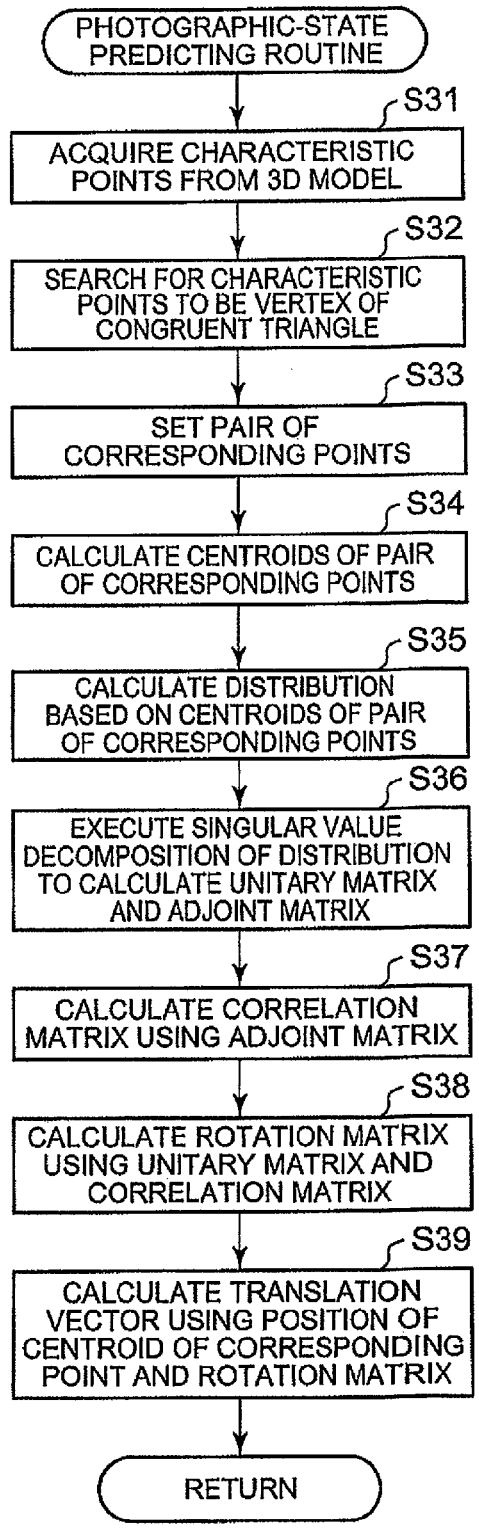

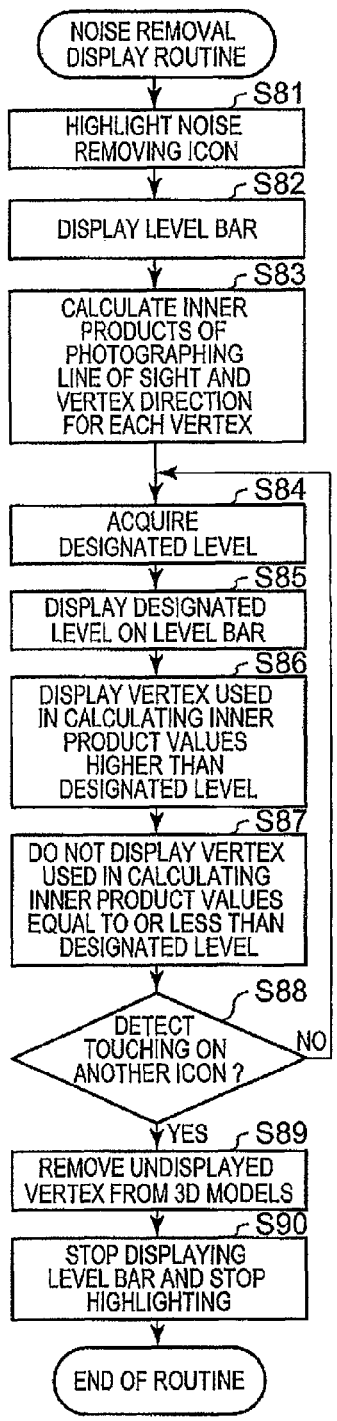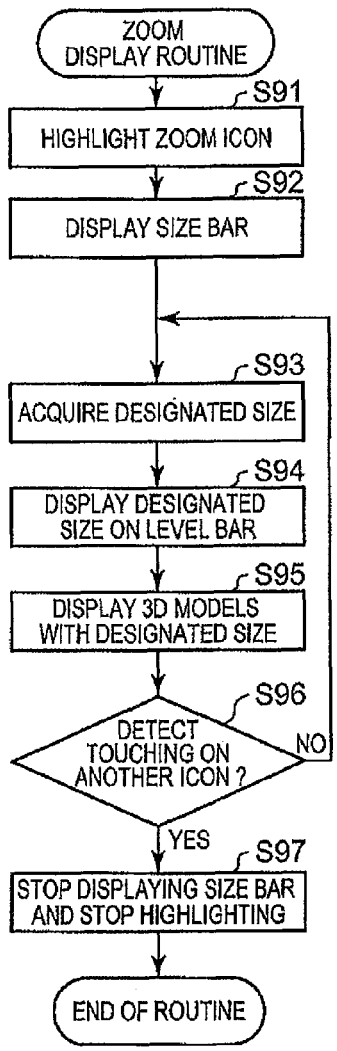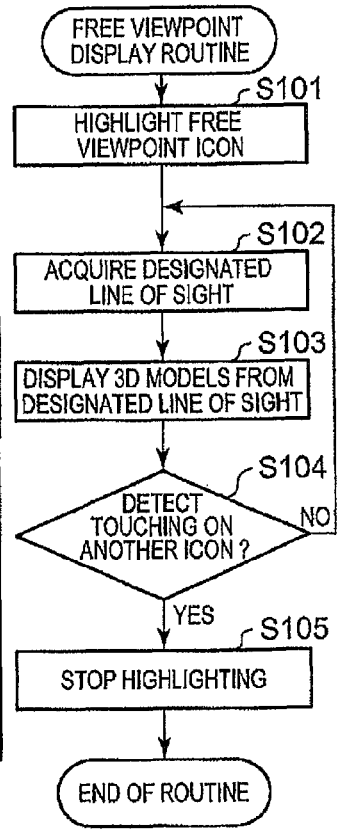

IMAGING APPARATUS CAPABLE OF GENERATING THREE-DIMENSIONAL IMAGES, THREE-DIMENSIONAL IMAGE GENERATING METHOD, AND RECORDING MEDIUM

CROSS REFERENCE TO RELATED APPLICATION

This is a Divisional of U.S. application Ser. No. 13/161,645, filed Jun. 16, 2011, which is based upon and claims the benefit of priority from Japanese Patent Application No. 2010-147924, filed Jun. 29, 2010, the entire contents of both of which are incorporated herein by reference.

FIELD

The present invention relates to an imaging apparatus capable of generating three-dimensional (3D) images, a three-dimensional image generating method, and a non-temporary computer readable recording medium.

BACKGROUND

"Digital Image Processing" by Yoichi Sato, published by CG-ARTS Society, issued Nov. 2, 2009, pp. 251-262 (Non-patent Literature 1) discloses a technique of fixing two cameras in the arrangement where their optical axes are in parallel to each other and the coordinate axes in the image coordinate systems are on the same line and in the same direction (i.e., parallel stereo). Non-patent Literature 1 also discloses a technique of generating the 3D image of an object to be imaged (or a subject) based on the difference in how the subject is seen in the images captured by the two fixed cameras (i.e., parallax) and the distance between the cameras (i.e., base length).

Since the techniques disclosed in Non-patent Literature 1 cannot remove noise contained in a generated 3D image, they have a problem such that the 3D image of an imaged object cannot be generated accurately.

SUMMARY

Accordingly, it is an object of the present invention to provide an imaging apparatus, a 3D image generating method, and a computer readable recording medium which enable accurate generation of the 3D image of a subject.

To achieve the object, according to a first aspect of the invention, there is provided an imaging apparatus including:
  an imaging unit that photographs a subject;
  a model generator that generates a three-dimensional (3D) model of the subject using the photographed image photographed by the imaging unit;
  a noise determining unit that, when a corresponding point corresponding to a point forming the 3D model generated by the model generator does not form a 3D model generated using a photographed image photographed at a position different from the photographing position of the photographed image used in the generation of the 3D model by the model generator, determines that the point is noise;
  a noise removing unit that removes the point determined as noise by the noise determining unit from the 3D model generated by the model generator; and
  a 3D image generator that generates a 3D image based on the 3D model from which noise is removed by the noise removing unit.

To achieve the object, according to a second aspect of the invention, there is provided a 3D image generating method for an imaging apparatus, including the steps of:
  photographing a subject;
  generating a 3D model of the subject using the photographed image;
  when a corresponding point corresponding to a point forming the generated 3D model does not form a 3D model generated using a photographed image photographed at a position different from the photographing position of the photographed image used in the generation of the 3D model, determining that the point is noise;
  removing the point determined as noise from the generated 3D model; and
  generating a 3D image based on the noise-removed 3D model.

To achieve the object, according to a third aspect of the invention, there is provided a non-transitory computer readable recording medium storing a program that allows a computer controlling an imaging apparatus generating a 3D image to achieve:
  photographing a subject;
  generating a 3D model of the subject using the photographed image;
  when a corresponding point corresponding to a point forming the generated 3D model do not form a 3D model generated using a photographed image photographed at a position different from the photographing position of the photographed image used in the generation of the 3D model, determining that the point is noise;
  removing the point determined as noise from the generated 3D model; and
  generating a 3D image based on the noise-removed 3D model.

BRIEF DESCRIPTION OF THE DRAWING

A more complete understanding of this application can be obtained when the following detailed description is considered in conjunction with the following drawings, in which:

FIG. 6A is a flowchart illustrating one example of a model updating routine which is executed by the model updating unit;

FIG. 6B is a flowchart illustrating one example of a photographic-state predicting routine which is executed by a photographic-state predicting unit;

FIG. 13A is a flowchart illustrating one example of a noise removal display routine which is executed by the model editing unit;

FIG. 13B is a flowchart illustrating one example of a zoom display routine which is executed by the model editing unit;

FIG. 13C is a flowchart illustrating one example of a free viewpoint display routine which is executed by the model editing unit.

DESCRIPTION

An embodiment of the present invention will now be described with reference to the accompanying drawings.

<Embodiment>

Figure 1A:
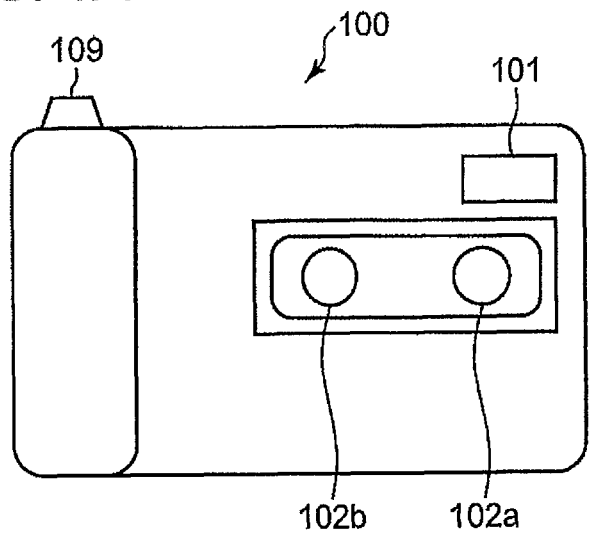
FIG. 1A is a front view showing one example of an imaging apparatus according to an embodiment of the present invention.
Figure 2A:
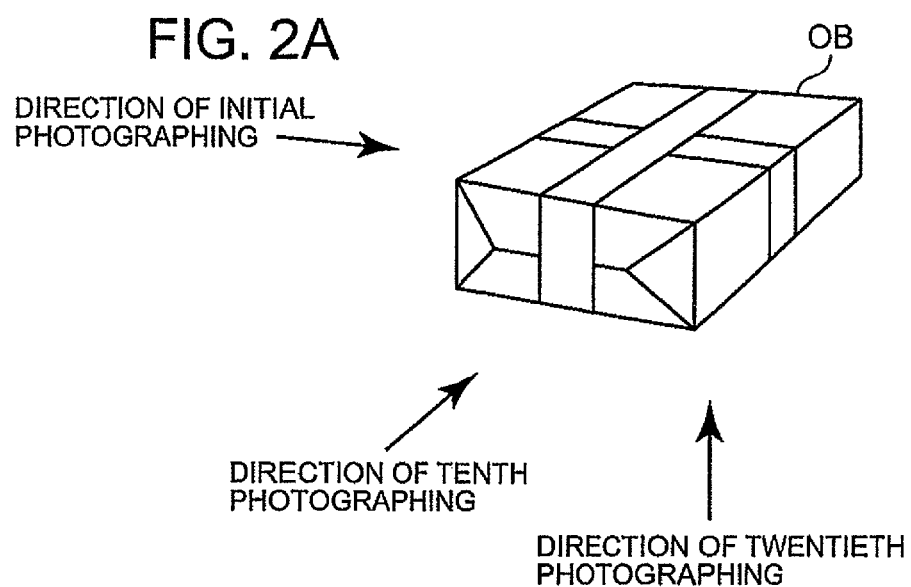
FIG. 2A is a diagram showing one example of a subject to be photographed by the imaging apparatus according to the embodiment and a photographing position.
Figure 2B:
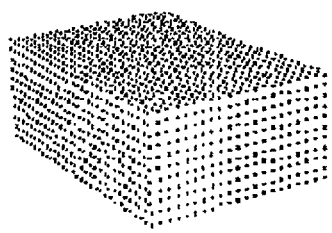
FIG. 2B is a diagram showing one example of a 3D model of a subject which is generated by first photographing.
Figure 2C:
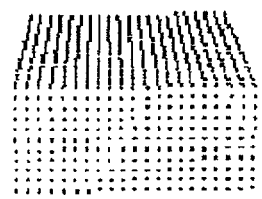
FIG. 2C is a diagram showing one example of a 3D model of the subject which is generated by tenth photographing.
Figure 2D:
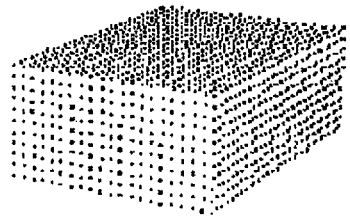
FIG. 2D is a diagram showing one example of a 3D model of the subject which is generated by twentieth photographing.

An imaging apparatus 100 according to an embodiment of the invention is a digital camera having the shape of a so-called compact camera which is portable as shown in FIG. 1A. The imaging apparatus 100 captures the image of a subject (or an object to be photographed) multiple times at each of photographing positions changed as shown in FIG. 2A. The imaging apparatus 100 generates a plurality of 3D models of the subject as shown in FIGS. 2B to 2D based on the photographed images acquired at each photographing position, and combines the generated 3D models. Then, the imaging apparatus 100 generates a 3D image based on the combined 3D model.

The imaging apparatus 100 has a strobe emission window 101, and photographing lenses 102a and 102b on the front side as shown in FIG. 1A. The strobe emission window 101 irradiates xenon-flashed strobe light toward the subject as needed.

Figure 1B:
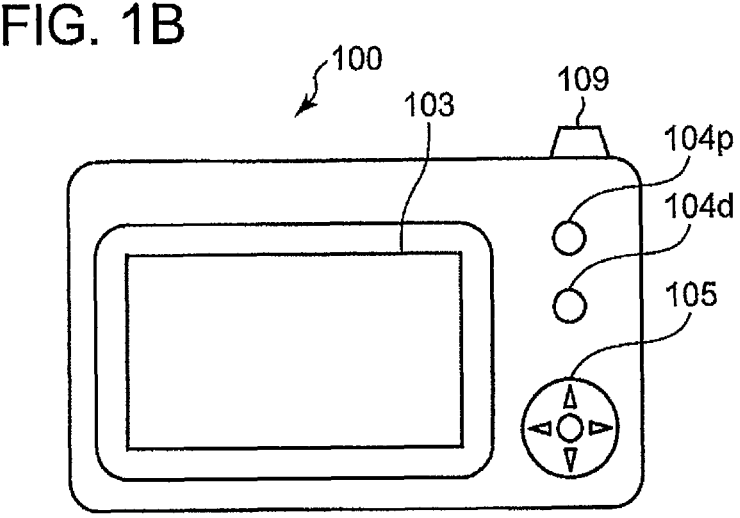
FIG. 1B is a rear view showing one example of the imaging apparatus.

As shown in FIG. 1B, the imaging apparatus 100 has a display unit 103 as a monitor screen, a power key 104p, a 3D modeling key 104d and an operation key 105 at the back side of the imaging apparatus 100.

The display unit 103 has an LCD (Liquid Crystal Display) panel serving as a finder. The LCD panel of the display unit 103 displays various screens needed for the operation of the imaging apparatus 100, LiveView images at the time of photographing, images photographed by the imaging apparatus 100 (hereinafter called "photographed images") and a 3D image generated based on the photographed images. Further, the display surface of the LCD panel is covered with a transparent touch panel. The touch panel outputs a signal corresponding to a touching operation of a user (e.g., a signal representing the coordinate values of a touched position).

The power key 104p, when pressed long with the imaging apparatus 100 powered ON, inputs a signal instructing that the imaging apparatus 100 is to be powered OFF. When pressed with the imaging apparatus 100 powered OFF, the power key 104p inputs a signal instructing that the imaging apparatus 100 is to be powered ON.

The 3D modeling key 104d performs a toggle operation and inputs a signal selectively changing between a normal photographing mode of carrying out normal photographing and a 3D modeling mode of generating a 3D image every time the key 104d is pressed.

The operation key 105 has an arrow key and an EXECUTE key. The arrow key inputs a signal corresponding to the user's selection operation to select an icon displayed on the display unit 103 to the imaging apparatus 100 when the photographing mode is changed or when the display is changed. The EXECUTE key inputs a signal corresponding to the user's decision operation to decide to execute an instruction (or command) associated with the selected icon to the imaging apparatus 100.

Figure 1C:
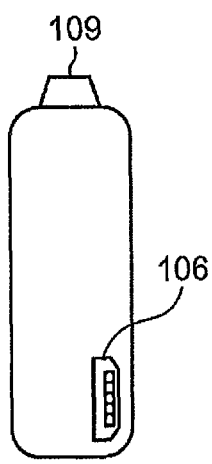
FIG. 1C is a right side view showing one example of the imaging apparatus.
Figure 1D:
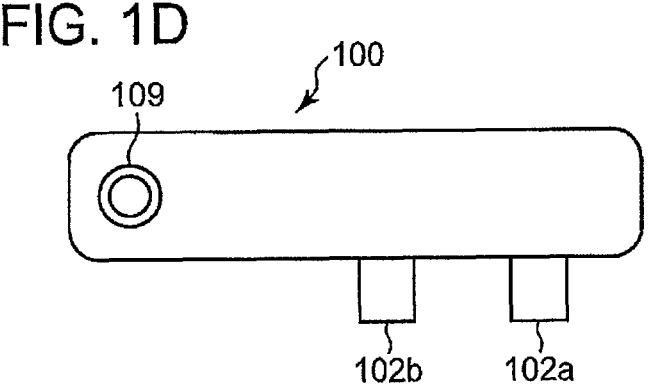
FIG. 1D is a top view showing one example of the imaging apparatus.

Further, the imaging apparatus 100 has, on the right-hand side, an external interface unit (hereinafter called "external I/F unit") 106 which is a USB (Universal Serial Bus) connection terminal, as shown in FIG. 1C. The external I/F unit 106 may be a video output terminal. In addition, the imaging apparatus 100 has a shutter button 109 on the top side as shown in FIG. 1D.

Next, the circuit configuration of the imaging apparatus 100 will be described.

Figure 3:
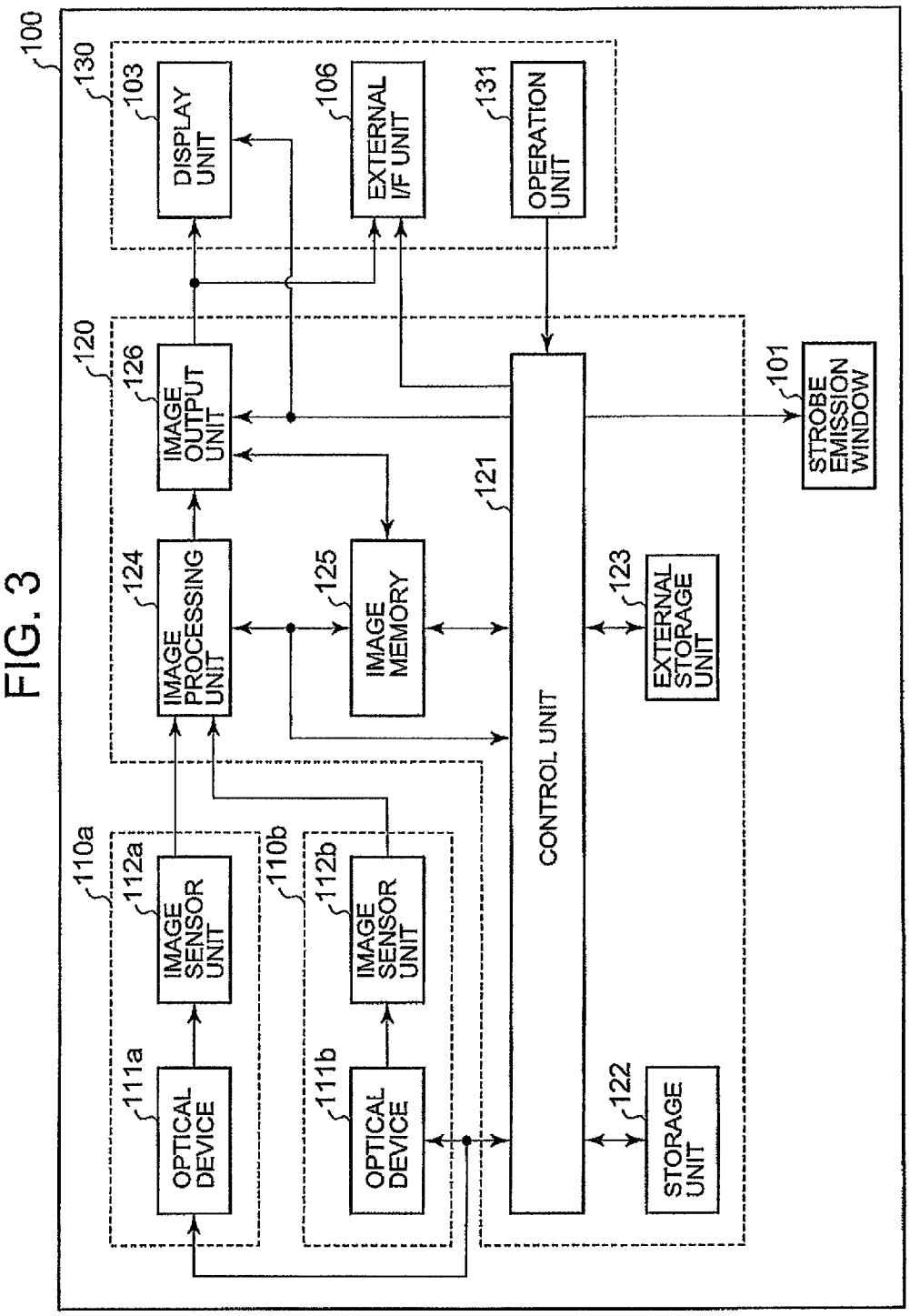
FIG. 3 is a block diagram showing one example of the circuit configuration of the imaging apparatus.

The imaging apparatus 100 includes two imaging units 110a and 110b, a data processor 120 and an interface unit (hereinafter simply called "I/F unit") 130 as shown in FIG. 3.

The imaging units 110a and 110b are arranged to provide parallel stereo. In other words, the photographing lens 102a (FIG. 1A) of the imaging unit 110a and the photographing lens 102b of the imaging unit 110b are arranged on the same plane that forms the outer surface of the imaging apparatus 100 in such a way that their central positions lie on the same horizontal line of the imaging apparatus 100 when the imaging apparatus 100 is used with the shutter button 109 facing upward. That is, when the imaging units 110a and 110b are operated at the same time to photograph the same subject, the optical axial position of the photographed image acquired by the imaging unit 110a and the optical axial position of the photographed image acquired by the imaging unit 110b are laterally misaligned with each other. This is because that the imaging unit 110a and the imaging unit 110b are fixed in the arrangement where their optical axes are in parallel to each other and their coordinate axes in the respective image coordinate systems lie on the same line and in the same direction (i.e., parallel stereo). Since the imaging unit 110a and the imaging unit 110b have the same configuration, the description of the imaging unit 110b will be omitted.

The imaging unit 110a comprises an optical device 111a and an image sensor unit 112a. The optical device 111a has the photographing lens 102a in FIG. 1A, and an aperture mechanism and a shutter mechanism neither shown, and performs an optical operation associated with photographing a subject. In this optical operation, when incident light is collected using the photographing lens 102a, the focal distance and the aperture are adjusted. At the same time, the shutter speed is adjusted. In other words, the optical operation adjusts optical factors, such as the angle of view, focus and exposure. The shutter mechanism of the optical device 111a is a so-called mechanical shutter. When the shutter operation is carried out in the operation of the image sensor, however, the optical device 111a need not have the shutter mechanism.

The image sensor unit 112a comprises a CCD (Charge Coupled Device). The image sensor unit 112a performs photoelectric conversion to generate an electric signal according to the incident light collected by the optical device 111a. The image sensor unit 112a outputs the generated electric signal to the data processor 120. It is to be noted that the image sensor unit 112a may comprise a CMOS (Complementary Metal Oxide Semiconductor).

The data processor 120 processes the electric signal output from the imaging unit 110a or the imaging unit 110b to generate digital data representing the photographed image taken by the imaging unit 110a or the imaging unit 110b. The data processor 120 also performs image processing on the photographed image represented by the generated data. The data processor 120 includes a control unit 121, a storage unit 122, an external storage unit 123, an image processing unit 124, an image memory 125 and an image output unit 126.

The control unit 121 includes a CPU (Central Processing Unit) and RAM (Random Access Memory) neither shown, and executes a program stored in the storage unit 122 to control the individual units of the imaging apparatus 100.

The storage unit 122 comprises a ROM (Read Only Memory), and stores the program that is executed by the control unit 121, parameters used when the program is executed, and data representing arithmetic expressions. The storage unit 122 may be a flash memory.

The external storage unit 123 is configured by a memory card, which is a storage device mountable/dismountable to/from the imaging apparatus 100, to store image data representing a photographed image and data representing a 3D image generated based on the photographed image (hereinafter called "3D modeling data").

The image processing unit 124 includes an ADC (Analog-Digital Converter), a buffer memory and an image processor (so-called image processing engine) all not shown. The ADC converts an analog electric signal output from the image sensor unit 112a or 112b to a digital signal. The image processing unit 124 sequentially stores data represented by the converted digital signals in the buffer memory. Then, the image processor performs a developing process on the digital data stored in the buffer memory to adjust the quality of the photographed image and compress image data.

The image memory 125 temporarily stores image data generated by the image processing unit 124 and image data to be processed by the control unit 121.

The image output unit 126 comprises a circuit which generates an RGB signal, converts image data stored in the image memory 125 to an RGB signal, and outputs the RGB signal to the display unit 103 and the external I/F unit 106.

The I/F unit 130 provides an interface for the imaging apparatus 100 with the user of the imaging apparatus 100 or with an external device to be connected to the imaging apparatus 100. The I/F unit 130 includes the display unit 103 in FIG. 1B, the external I/F unit 106 in FIG. 1C and an operation unit 131. The operation unit 131 includes the power key 104p, the 3D modeling key 104d and the operation key 105 all shown in FIG. 1B, the touch panel (not shown) mounted on the display unit 103, and a controller for the touch panel.

Next, a 3D image generating routine which is executed by the imaging apparatus 100 using the hardware shown in FIG. 3 to generate 3D images will be described. The control unit 121 in FIG. 3 executes the 3D image generating routine as illustrated in FIG. 4 to function as an image pickup controller 141, an image acquiring unit 142, a model updating unit 143, a model editing unit 144, a 3D image generator 145 and a 3D image display controller 146 as shown in FIG. 5A.

Figure 4:
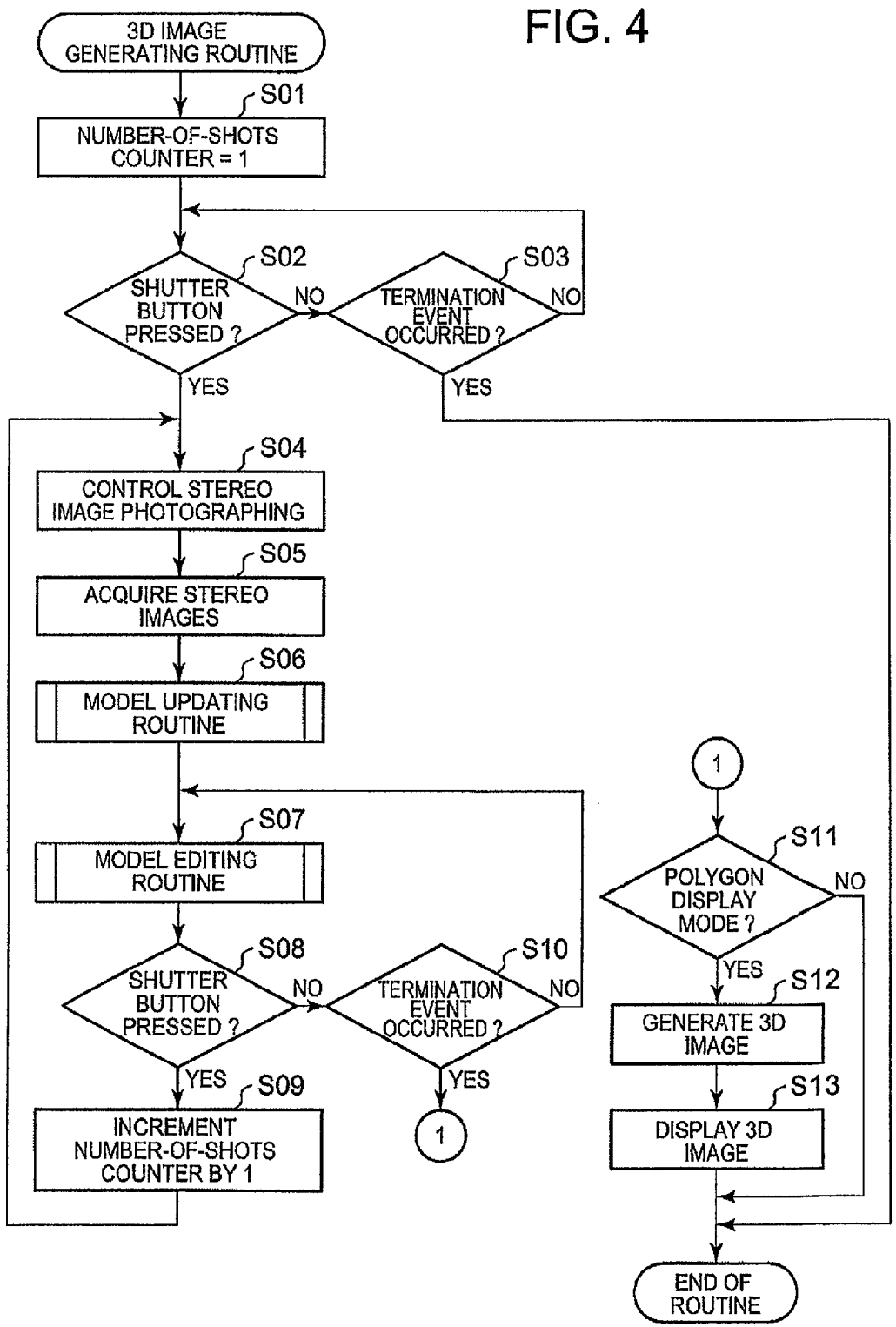
FIG. 4 is a flowchart illustrating one example of a 3D image generating routine which is executed by a control unit.
Figure 5A:
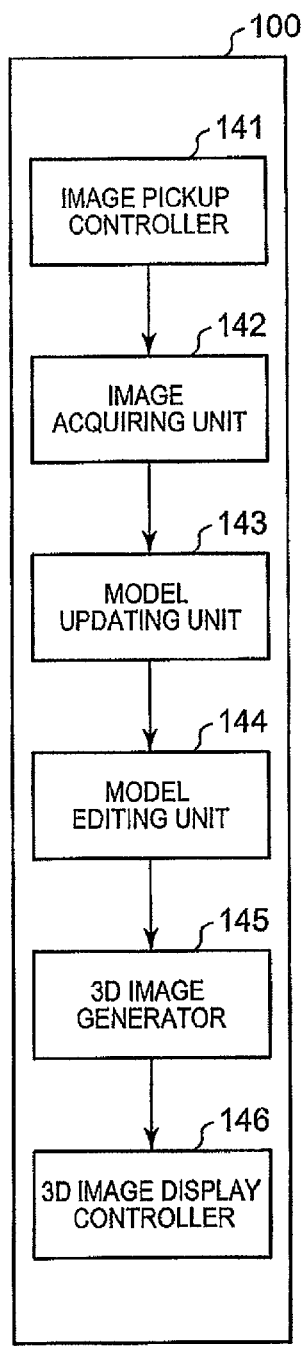
FIG. 5A is a functional block diagram showing one example of the functions of the imaging apparatus according to the embodiment.

When the user operates the 3D modeling key 104d in FIG. 1B to select the 3D modeling mode, the control unit 121 detects a signal output from the 3D modeling key 104d and starts the 3D image generating routine in FIG. 4. When the 3D image generating routine starts, the image pickup controller 141 in FIG. 5A initializes the value of a number-of-shots counter to "1" (step S01), the number-of-shots counter counting a number of times of photographing for generating the 3D image. Then, the image pickup controller 141 determines whether or not the shutter button 109 is pressed by the user based on the signal output from the shutter button 109 (step S02).

When it is determined in step S02 that the shutter button 109 is not pressed (step S02; No), the image pickup controller 141 determines whether or not a termination event has occurred (step S03). Specifically, for example, the image pickup controller 141 determines whether or not the termination event of pressing the shutter button 109 over a predetermined time has occurred (i.e., the shutter button 109 has been pressed long) based on the signal output from the shutter button 109. When it is determined that the termination event has occurred (step S03; Yes), the image pickup controller 141 terminates the execution of the 3D image generating routine. When it is determined that the termination event has not occurred (step S03; No), the image pickup controller 141 returns to step S02 to repeat the foregoing process.

When it is determined in step S02 that the shutter button 109 is pressed (step S02; Yes), the image pickup controller 141 controls the imaging units 110a and 110b to photograph the subject (step S04). Next, the image acquiring unit 142 acquires photographed images from the imaging units 110a and 110b respectively (step S05). The set of the photographed images from the imaging unit 110a and the imaging unit 110b arranged in parallel stereo are called paired images (or stereo images). The photographed image from the imaging unit 110a is hereinafter called "photographed image A", and the photographed image from the imaging unit 110b is hereinafter called "photographed image B".

Figure 5B:
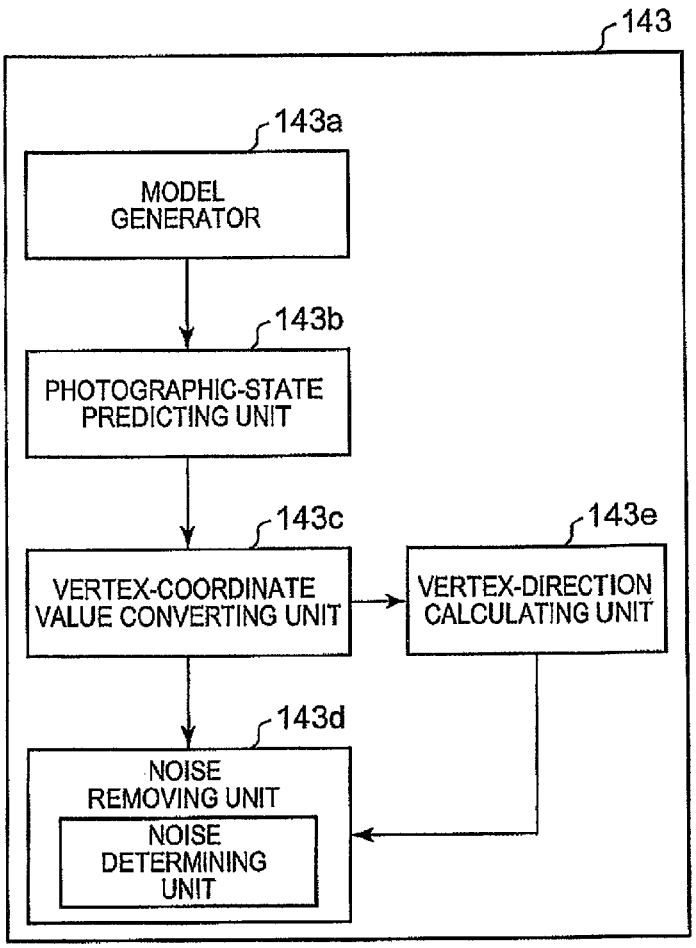
FIG. 5B is a functional block diagram showing one configurational example of a model updating unit.

Next, the model updating unit 143 executes a model updating routine of generating a 3D model of the subject based on the paired images acquired in step S05, and adding the 3D model generated currently to a 3D model group which is comprised of a plurality of 3D models generated up to the previous generation to update the 3D model group (step S06). The model updating unit 143 comprises a model generator 143a, a photographic-state predicting unit 143b, a vertex-coordinate value converting unit 143c, a noise removing unit 143d (including a noise determining unit), and a vertex-direction calculating unit 143e as shown in FIG. 5B, and uses those units to execute the model updating routine as shown in FIG. 6A.

When the model updating routine in FIG. 6A starts, the model generator 143a generates a 3D model of the photographed subject based on the paired images acquired in step S05 in FIG. 4 (the process is also called "3D modeling") (step S21). A 3D model is a set of three-dimensional coordinate values representing the positions of a plurality of points representing the subject.

Figure 7:
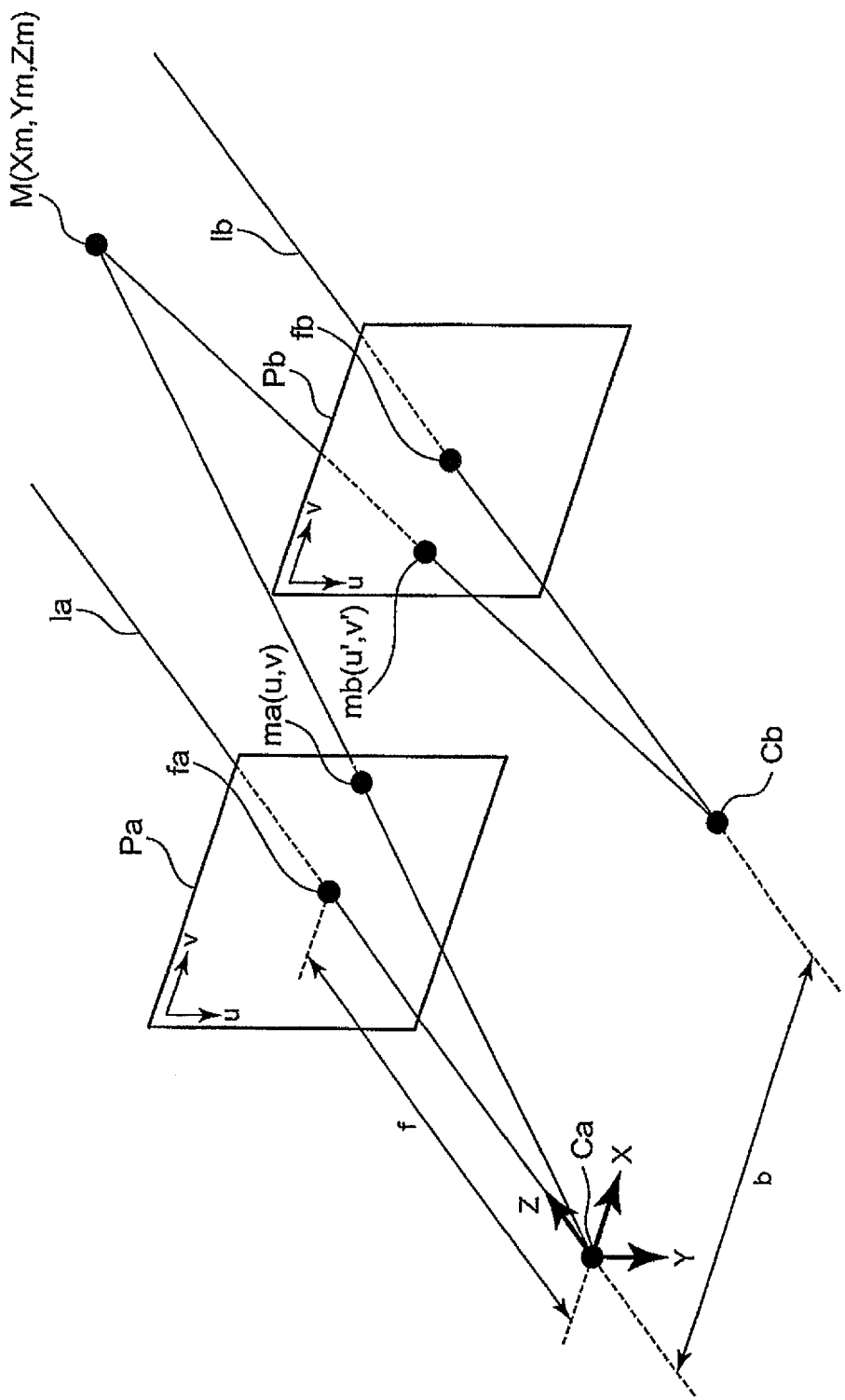
FIG. 7 is a diagram showing one example of a perspective projection model of an imaging unit.

As one example, the model generator 143a generates a 3D model from the paired images using the method disclosed in page 259 in "Digital Image Processing" (Non-patent Literature 1). According to this method, the coordinate values (Xm, Ym, Zm) of a point M forming the 3D model of the subject are calculated using following equations 1 to 3 as expressed by perspective projection models of the imaging units 110a and 110b as shown in FIG. 7.

$$Xm = \frac{(b \times u)}{(u - u')} \tag{1}$$

$$Ym = \frac{(b \times v)}{(u - u')} \tag{2}$$

$$Zm = \frac{(b \times f)}{(u - u')} \tag{3}$$

The symbols u and v represent coordinate values (u, v) of a position ma where the point M on the subject is represented on the photographed image A. The symbols u' and v' represent coordinate values (u', v') of a position mb where the point M on the subject is represented on the photographed image B. The symbol b represents the base length or the distance between a main point Ca of the imaging unit 110a and a main point Cb of the imaging unit 110b. The symbol f represents the focal distance between the main point Ca of the imaging unit 110a and a focal point fa thereof. Since the configuration of the imaging unit 110a is identical to that of the imaging unit 110b, the focal distance f is equal to the distance between the main point Cb of the imaging unit 110b and a focal point fb thereof. The coordinate values (u, v) representing the position ma are coordinate values in an image coordinate system Pa formed of coordinate axes u and v which are aligned with the longitudinal direction (sub scanning direction) and the lateral direction (main scanning direction) of the photographed image A with the origin being the upper left corner of the photographed image A projected on the projection plane of the imaging unit 110a. Likewise, the coordinate values (u', v') representing the position mb are coordinate values in an image coordinate system Pb formed of coordinate axes u and v which are aligned with the longitudinal direction (sub scanning direction) and the lateral direction (main scanning direction) of the photographed image B with the origin being the upper left corner of the photographed image B projected on the projection plane of the imaging unit 110b.

Further, the coordinate values (Xm, Ym, Zm) of the point M are expressed by the world coordinate system used in the current process. The origin of the world coordinate system used in the current process is the position of the main point Ca of the imaging unit 110a at the current photographing position. The X axis and Y axis of the world coordinate system used in the current process are in parallel to the u axis and v axis of the image coordinate system Pa at the current photographing position. The Z axis of the world coordinate system is in parallel to an optical axis 1a of the imaging unit 110a (and an optical axis 1b of the imaging unit 110b). That is, even when the vertex whose coordinate values are calculated in step S21 is the same point on the subject, it is calculated as different values depending on the photographing position and photographing direction of the imaging apparatus 100. This is because the coordinate systems are different.

After generating a 3D model, the model generator 143a performs Delaunay triangulation on points represented by the individual coordinate values forming a 3D model generated from paired images (hereinafter the points are called "points forming a 3D model") to acquire polygon information representing a triangular polygon. The model generator 143a adds the acquired polygon information to information representing the 3D model.

After step S21 in FIG. 6A, the photographic-state predicting unit 143b predicts the current photographing state based on the initial photographing state (i.e., photographing position and photographing direction where paired images have been photographed when the value of the number-of-shots counter is "1"). That is, the photographic-state predicting unit 143b executes a photographic-state predicting routine as shown in FIG. 6B (step S22). The following description will be given on the premise that the photographing direction for paired images is the optical axial direction of the imaging unit 110a (or the optical axial direction of the imaging unit 110b).

When the photographic-state predicting routine in FIG. 6B starts, the photographic-state predicting unit 143b acquires characteristic points from the 3D model generated initially and the 3D model generated currently (step S31). For example, the photographic-state predicting unit 143b selects, as the characteristic points, those in the vertexes forming each 3D model which are equivalent to points that have a high corner intensity in the paired images and high coincidence in the stereo matching.

Next, the photographic-state predicting unit 143b searches triangles having the three characteristic points of the 3D model currently generated after selection of the three characteristic points from the initial 3D model, as vertexes, for plural sets of triangles congruent with the triangle that has the selected three characteristic points as vertexes (step S32). This process is carried out to specify points representing points on the same subject (i.e., a pair of corresponding points) from points of the initial 3D model and points of the current 3D model. The photographic-state predicting unit 143b determines that two triangles are congruent with each other if each difference between the lengths of each of the three sides of the two triangles is equal to or less than a predetermined value.

The photographic-state predicting unit 143b numbers the individual vertexes of the searched triangles starting from value "1". Next, the photographic-state predicting unit 143b sets a pair of corresponding points p1 and p'1 by substituting the coordinate values (x1, y1, z1) of the vertex (forming the current 3D model) numbered as "1" and the coordinate values (x'1, y'1, z'1) of the vertex (forming the initial 3D model) which is the vertex of a triangle congruent with the searched triangles and corresponds to the vertex forming the current 3D model into following equations 4 and 5. In addition, the photographic-state predicting unit 143b sets a pair of corresponding points pi and p'i (where i=2 to N and N is the number of pairs) for other vertexes numbered as "2" to "N" (step S33).

$$p_i = \begin{bmatrix} x_i \\ y_i \\ z_i \end{bmatrix} (i = 1, 2, \ldots, N) \tag{4}$$

$$p'_i = \begin{bmatrix} x'_i \\ y'_i \\ z'_i \end{bmatrix} \quad (i = 1, 2, \ldots, N) \quad (5)$$

Figure 8:
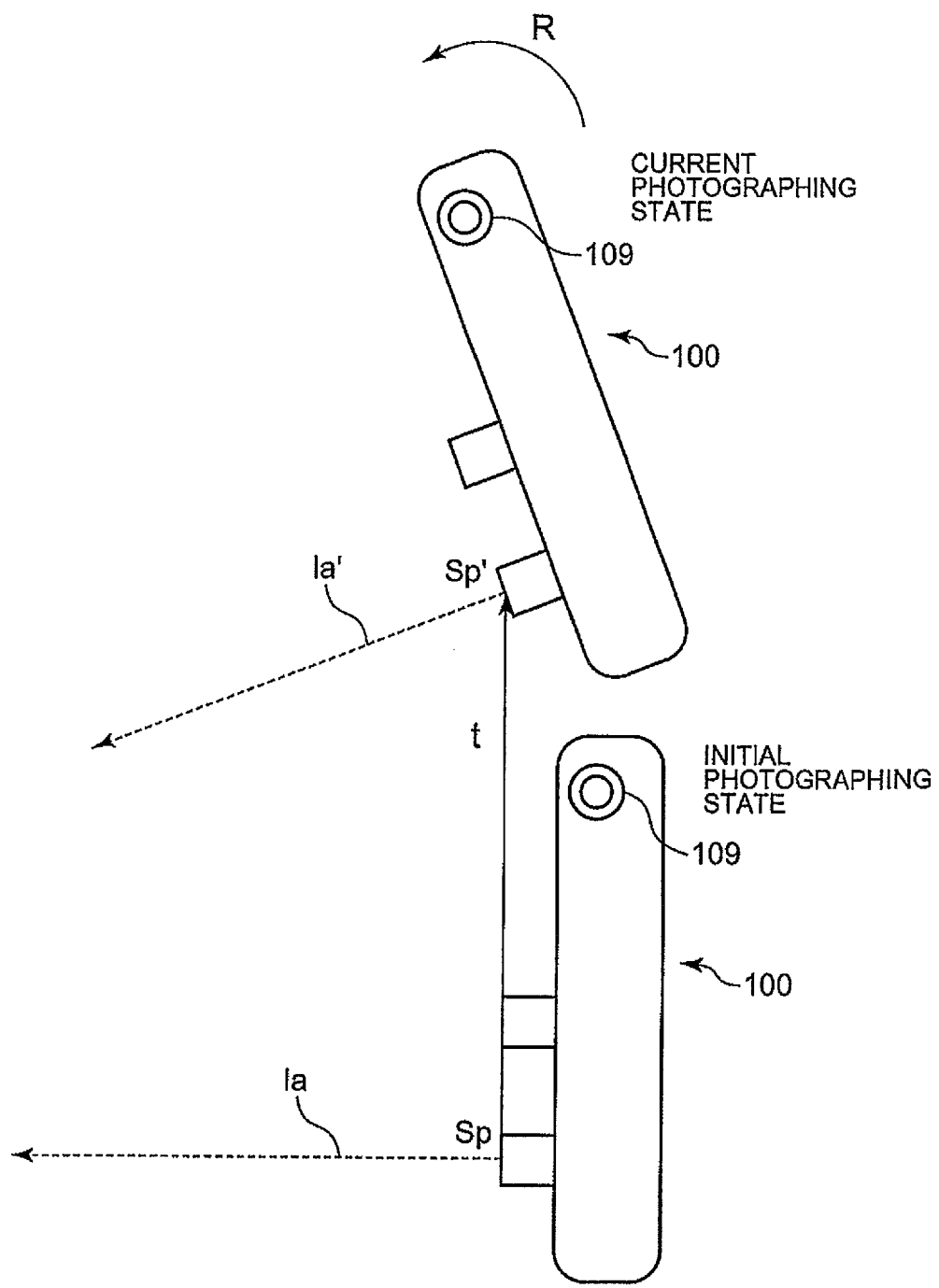
FIG. 8 is a diagram showing one example of a rotation matrix R and a translation vector t which represent another photographing state based on the first photographing state.

The relation between the current photographing position and photographing direction and the initial photographing position and photographing direction is expressed by a movement vector t representing movement from the initial photographing position Sp to the current photographing position Sp' (hereinafter called "translation vector t") and a rotation matrix R representing the rotation of the imaging apparatus 100 (see FIG. 8). Accordingly, the corresponding point pi expressed by the equation 4 is expressed by the following equation 6 involving the corresponding point p'i expressed by the equation 5, the rotation matrix R and the translation vector t.

$$p_i = Rp_i' + t \quad (6)$$

The photographic-state predicting unit 143b can take the configuration that directly calculates the rotation matrix R and the translation vector t from the equation 6. To reduce the influence of noise and calculate the rotation matrix R stably and accurately, however, the photographic-state predicting unit 143b executes the following process.

After step S33, the photographic-state predicting unit 143b calculates the centroid of the corresponding point p using the following equation 7, and calculates the centroid of the corresponding point p' using the following equation 8 (step S34). Next, the photographic-state predicting unit 143b calculates a distribution d1 of the corresponding point p based on the calculated centroid using the following equation 9, and calculates a distribution d2 of the corresponding point p' based on the calculated centroid using the following equation 10 (step S35).

$$t1 = \frac{1}{N} \sum_{i=1}^{N} p_i \quad (7)$$

$$t2 = \frac{1}{N} \sum_{i=1}^{N} p'_i \quad (8)$$

$$d1 = [(p_1 - t1)(p_2 - t1) \ldots (p_N - t1)] \quad (9)$$

$$d2 = [(p'_1 - t2)(p'_2 - t2) \ldots (p'_N - t2)] \quad (10)$$

Since the corresponding point p and the corresponding point p' represent a plurality of points on the same subject, the distribution d1 based on the centroid of the corresponding point pi and the distribution d2 based on the centroid of the corresponding point p'i substantially coincide with each other. In addition, with the centroid being the basis, the relation between the distribution d1 and the distribution d2 is not determined by the translation vector t, but is determined only by the rotation matrix R. Thus, the distribution d1 and the distribution d2 fulfill the following equation 11.

$$d1 = Rd2 \quad (11)$$

To calculate the rotation matrix R from the above equation 11, the photographic-state predicting unit 143b executes singular value decomposition of the distribution d1 and the distribution d2 to calculate unitary matrices U1 and U2, diagonal matrices S1 and S2 of the singular value, and adjoint matrices V1* and V2* after step S35 (step S36). It is assumed that the singular values are sorted in the descending order, and the symbol * represents a complex conjugate transpose.

$$d1 = U_1 S_1 V_1^* \quad (12)$$

$$d2 = U_2 S_2 V_2^* \quad (13)$$

From the above equations 12 and 13 and the above equation 11, the rotation matrix R is expressed by the following equation 14.

$$R = U_1 S_1 V_1^* V_2 S_2^{-1} U_2^* \quad (14)$$

Given that a matrix which correlates the matrix U1 with the matrix U2* is a correlation matrix K as given by the following equation 15, the rotation matrix R is expressed by the following equation 16.

$$K = S_1 V_1^* V_2 S_2^{-1} \quad (15)$$

$$R = U_1 K U_2^* \quad (16)$$

The column vectors of the unitary matrices U1 and U2 respectively correspond to the eigen vector of the distribution d1 and the eigen vector of the distribution d2. Thus, elements in the correlation matrix K correlating the matrix U1 with the matrix U2 are "1" or "4" when their eigen vectors correspond to each other, and are "0" otherwise. Since the distribution d1 and the distribution d2 are identical to each other, the singular values decomposed from the distribution d1 are identical to those decomposed from the distribution d2 (i.e., the diagonal matrices S1 and S2 of the singular values are identical to each other). However, since the distribution d1 and the distribution d2 actually contain errors, it is necessary to round the errors. Thus, the correlation matrix K is expressed by, for example, the following equation 17 which uses a round function to perform round off.

$$K = \text{round}((\text{first to third rows of } V_1^*)(\text{first to third columns of } V_2)) \quad (17)$$

Accordingly, after step S36 in FIG. 6B, the photographic-state predicting unit 143b calculates the correlation matrix K from the above equation 17 using the adjoint matrices V1* and V2* calculated in step S36 (step S37). Then, the photographic-state predicting unit 143b substitutes the calculated correlation matrix K and the unitary matrices U1 and U2 calculated in step S36 in the equation 16 to calculate the rotation matrix R (step S38).

Since the vectors directed toward the corresponding points from the respective centroids of the pair of corresponding points are equal to each other when the vectors are rotated by the rotation matrix R, the following equation 18 is satisfied, and transforming the equation 18 yields the following equation 19.

$$(p_i - t1) = R(p_i' - t2) \quad (18)$$

$$p_i = Rp_i' + (t1 - Rt2) \quad (19)$$

Substituting pi expressed by the equation 19 into the equation 6 yields the following equation 20 which is used to calculate the translation vector t.

$$t = t1 - Rt2 \quad (20)$$

Accordingly, the photographic-state predicting unit 143b calculates the translation vector t from the equation 20 using centroids t1 and t2 calculated in step S34 after step S38 (step S39). Then, the photographic-state predicting unit 143b terminates execution of the photographic-state predicting routine.

After step S22 in FIG. 6A, the vertex-coordinate value converting unit 143c in FIG. 5B converts the coordinate values of the polygon vertexes forming the 3D model generated in step S21 from the coordinate values of the world coordinate system used in the current processing to the coordinate values of the world coordinate system used in the initial processing (step S23). Specifically, the vertex-coordinate value converting unit 143c converts coordinate values W in the current world coordinate system to coordinate values W' in the initial world coordinate system using the translation vector t representing the photographing position of the imaging apparatus 100 and the rotation matrix R representing the photographing direction thereof, both predicted in step S22, in the following equation 21. Thereafter, the vertex-coordinate value converting unit 143c saves data representing a model formed of the converted vertex coordinate values in the external storage unit 123 in association with the value of the number-of-shots counter.

$$W'=\text{inv}(R)(W-t) \quad (21)$$

where inv(R) represents the inverse matrix of the rotation matrix R.

Figure 9A:
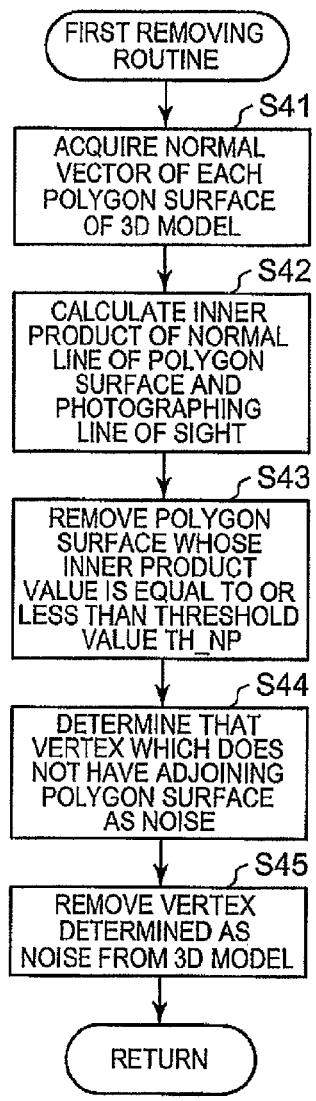
FIG. 9A is a flowchart illustrating one example of a first removing routine which is executed by a noise removing unit.

After step S23, the noise removing unit 143d in FIG. 5B removes noise from the 3D model using the directions of polygon surfaces forming the currently generated 3D model. That is, the noise removing unit 143d in FIG. 5B executes the first removing routine as illustrated in FIG. 9A. Noise which the noise removing unit 143d removes includes, for example, a point in the 3D model which does not correspond to a point on the subject.

When starting executing the first removing routine, first, the noise removing unit 143d acquires the normal vector of each polygon surface based on the coordinate values of the vertexes of each polygon surface forming the 3D model generated in step S21 (step S41). Of two kinds of vectors, namely the vector in the same direction as the camera's line of sight of the imaging apparatus 100 (or the optical axial direction of the imaging unit 110a) (i.e., the inner product of the normal vector and the camera's line of sight is positive) and the opposite vector, the vector in the same direction as the camera's line of sight is the normal vector of a polygon surface which is acquired in step S41.

Next, the noise removing unit 143d specifies the direction of the current camera's line of sight from the rotation matrix R calculated in step S38 in FIG. 6B, and then calculates the inner product of the specified camera's line of sight and the normal vector of each polygon surface (step S42). Then, the noise removing unit 143d removes a polygon surface that the value of the calculated inner product is equal to or less than a predetermined threshold value TH_NP from the 3D model (step S43).

Next, the noise removing unit 143d (noise determining unit) determines that a vertex which is not used in defining a polygon surface is noise (step S44). Then, the noise removing unit 143d removes the vertex determined as noise from the currently generated 3D model (step S45). Then, the noise removing unit 143d terminates the first removing routine.

Those configurations make it possible to accurately determine whether a vertex defining a polygon surface is noise or not, based on the direction of the polygon surface with respect to the camera's line of sight. Since a polygon surface for which the inner product of the camera's line of sight and the normal vector is lower is not facing the camera's line of sight straight, sufficient information to generate a model is unlikely shown on paired images used in generation of the 3D model, so that the polygon surface is likely to contain noise.

After step S24 in FIG. 6A, the vertex-direction calculating unit 143e calculates the vertex direction for each vertex forming the 3D model (step S25). As one example, when there is a polygon surface defined by a certain vertex, the vertex-direction calculating unit 143e decides that the normal direction of the polygon surface is the vertex direction of the vertex. When there is a plurality of polygon surfaces defined by a certain vertex, the simple average of the normal directions of the polygon surfaces or the weighted average with the area being the weight is decided as the vertex direction of the vertex.

Figure 9B:
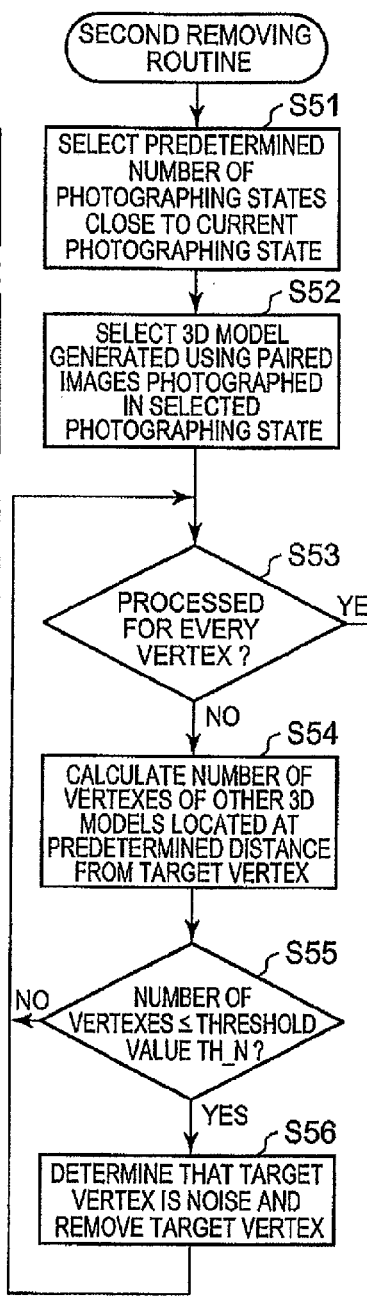
FIG. 9B is a flowchart illustrating one example of a second removing routine which is executed by the noise removing unit.

Next, the noise removing unit 143d determines whether or not the value of the number-of-shots counter is greater than a predetermined value K1 (step S26). When determining that the value of the number-of-shots counter is greater than the predetermined value K1 (step S26; Yes), the noise removing unit 143d adds the currently generated 3D model to the 3D model group in association with the current value of the number-of-shots counter and the photographing state predicted in step S22 in FIG. 6A (step S27). Then, the noise removing unit 143d removes noise using the photographing position. That is, the noise removing unit 143d executes a second removing routine as illustrated in FIG. 9B (step S28). This is because removing noise by the second removing routine needs 3D models whose quantity is greater than a predetermined number.

When starting executing the second removing routine as illustrated in FIG. 9B, the noise removing unit 143d selects K2 photographing states in the previous photographing states (or old photographing states) close to the current photographing state (step S51).

Specifically, the noise removing unit 143d selects the 3D models added to the 3D model group in association with the value of the number-of-shots counter whose difference from the current value of the number-of-shots counter is within K2, in the order of smaller-to-larger difference. This configuration makes it possible to select old photographing states close to the current photographing state with a smaller amount of calculation.

The selection is not limited to this scheme, and the noise removing unit 143d may select the 3D models added to the 3D model group in association with the rotation matrix whose distance from the currently predicted rotation matrix R (sum of squares of the differences of the individual elements of the matrix) is smaller than a threshold value TH_R1, in the order of smaller-to-larger distance. This configuration not only provides a higher accuracy than the method of selecting old photographing states close to the current photographing state based on the value of the number-of-shots counter, but also needs a smaller amount of calculation than the method of selecting old photographing states close to the current photographing state based on the translation vector t to be discussed later.

Further, the selection is not limited to those schemes, and the noise removing unit 143d may select the 3D models added to the 3D model group in association with the translation vector whose difference from the currently predicted translation vector t is smaller than a threshold value TH_T1, in the order of smaller-to-larger distance. This configuration provides a higher accuracy than the method of selecting old photographing states close to the current photographing state based on the rotation matrix R.

After step S51 in FIG. 9B, the noise removing unit 143d selects K2 3D models associated with the selected photographing state from the 3D model group (step S52), and then determines whether or not the processes of steps S54 to S56 to be discussed below have been executed for every vertex forming every selected 3D model (step S53). When it is determined that the processes have not been executed for every vertex yet (step S53; No), the noise removing unit 143d regards one of unprocessed vertexes as a vertex to be processed (hereinafter called "target vertex"), and regards a 3D model formed of the target vertex as a target model. Next, the noise removing unit 143d (noise determining unit) calculates the number of vertexes of other 3D models different from the target model and included in the spatial range (hereinafter called "near range") from the target vertex to a predetermined distance (hereinafter called "near distance") (step S54). Then, the noise removing unit 143d (noise determining unit) determines whether or not the number of the vertexes of other 3D models included in the near range is equal to or less than a predetermined threshold value TH_N (step S55).

When determining in step S55 that the number of the vertexes of other 3D models included in the near range is equal to or less than the predetermined threshold value TH_N (step S55; Yes), the noise removing unit 143d (noise determining unit) determines that the target vertex is noise. The noise removing unit 143d removes the target vertex from the 3D model including the target vertex determined as noise and the 3D model group (step S56). Then, the noise removing unit 143d returns to step S53 to repeat the sequence of processes.

Figure 10:
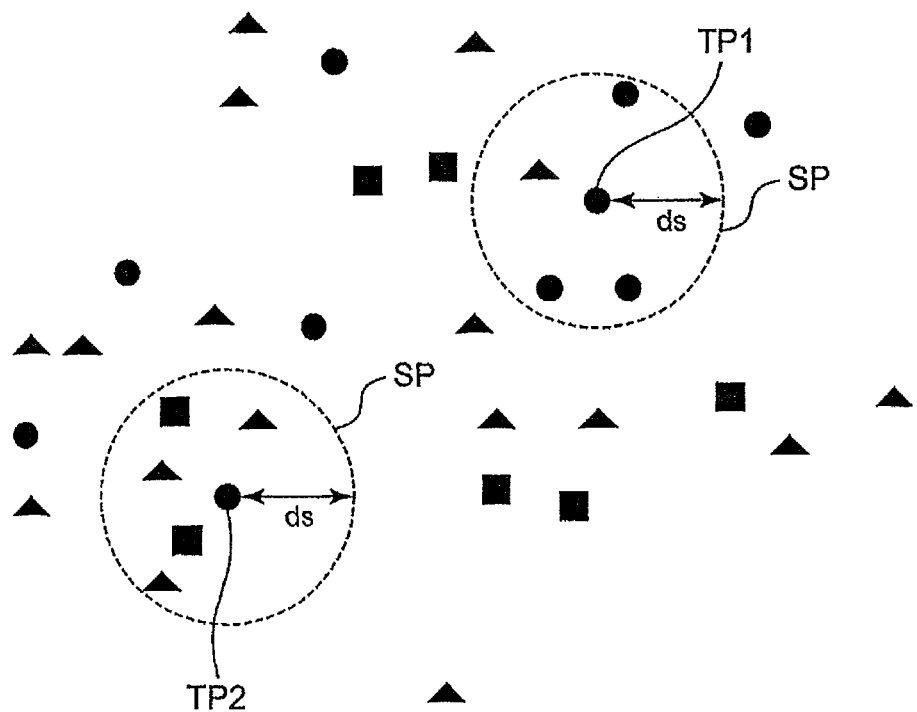
FIG. 10 is a diagram for explaining one example of a noise removing method using a photographing position.

Specifically, as shown in FIG. 10, a near range SP lying within a near distance ds from a target vertex TP1 contains three vertexes, like the target vertex TP1, forming a 3D model generated by using paired images which are obtained by the twentieth shot (hereinafter called "twentieth 3D model"). However, the near range SP contains only one vertex forming a sixteenth 3D model. When the predetermined threshold value TH_N is "1", therefore, the target vertex TP1 is determined as noise.

When the subject is photographed multiple times, a point on the same object is shown in a plurality of paired images, so that a point corresponding to a point on the object is normally included in a plurality of 3D models. According to those configurations, it is possible to accurately determine whether or not a point is noise based on the number of the points forming other 3D models included in the near range SP of that point. As the number of shots increases, the number of 3D models to be generated increases. As the number of shots increases, therefore, it is possible to more accurately determine whether or not a point on a 3D model is noise.

When determining in step S55 that the number of the vertexes of other 3D models included in the near range is greater than the predetermined threshold value TH_N (step S55; No), the noise removing unit 143d (noise determining unit) determines that the target vertex is not noise, and returns to step S53 to repeat the sequence of processes.

Specifically, as shown in FIG. 10, the near range SP of a target vertex TP2 contains three vertexes forming the sixteenth 3D model, and two vertexes forming an eleventh 3D model. When the predetermined threshold value TH_N is "1", therefore, the target vertex TP2 is not determined as noise.

Thereafter, when it is determined in step S53 in FIG. 9B that the processes of steps S54 to S56 have been executed for every vertex (step S53; Yes), the noise removing unit 143d terminates execution of the second removing routine.

Figure 9C:
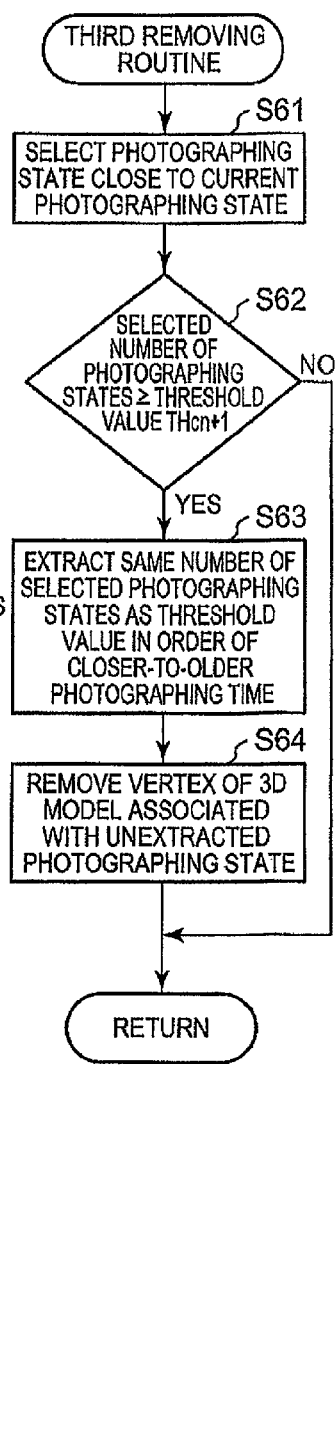
FIG. 9C is a flowchart illustrating one example of a third removing routine which is executed by the noise removing unit.

After step S28 in FIG. 6A, the noise removing unit 143d executes a third removing routine as illustrated in FIG. 9C to remove noise using the photographing time (step S29).

When the execution of the third removing routine starts, the noise removing unit 143d executes a process similar to the process in step S51 in FIG. 9B to select a photographing state close to the current photographing state (step S61). Next, the noise removing unit 143d determines whether or not the number of the selected photographing states (hereinafter the selected photographing-states number) is equal to or greater than a predetermined threshold value THcn+1 (step S62).

When it is determined that the selected photographing-states number is equal to or less than a predetermined threshold value THcn (step S62; No), the noise removing unit 143d terminates the execution of the third removing routine. This is because photographing states whose quantity is needed to execute the third removing routine have not been selected.

When it is determined in step S62 that the selected photographing-states number is equal to or greater than the predetermined threshold value THcn+1, the noise removing unit 143d extracts THcn photographing states in order from photographing states whose photographing times are new (i.e., the value of the number-of-shots counter is large) (step S63). Next, the noise removing unit 143d removes the vertexes of the 3D model which are associated with photographing states other than the extracted photographing states (i.e., generated using paired images photographed in photographing states other than the extracted photographing states) from the 3D model group (step S64). Then, the noise removing unit 143d terminates the execution of the third removing routine.

Even when the same subject is photographed at the same photographing position and from the same photographing direction, information on the subject expressed in the photographed paired images varies when the photographing time differs. For example, information on the subject expressed in the photographed paired images varies depending on the light on the subject, the background of the subject, or the movement of the subject itself. Since the vertexes of the 3D model generated using paired images photographed at an older photographing time are removed from the 3D model group according to those configurations, it is possible to reduce the difference between information on the subject shown in paired images and generate a 3D model group formed of uniform 3D models.

Figure 11:
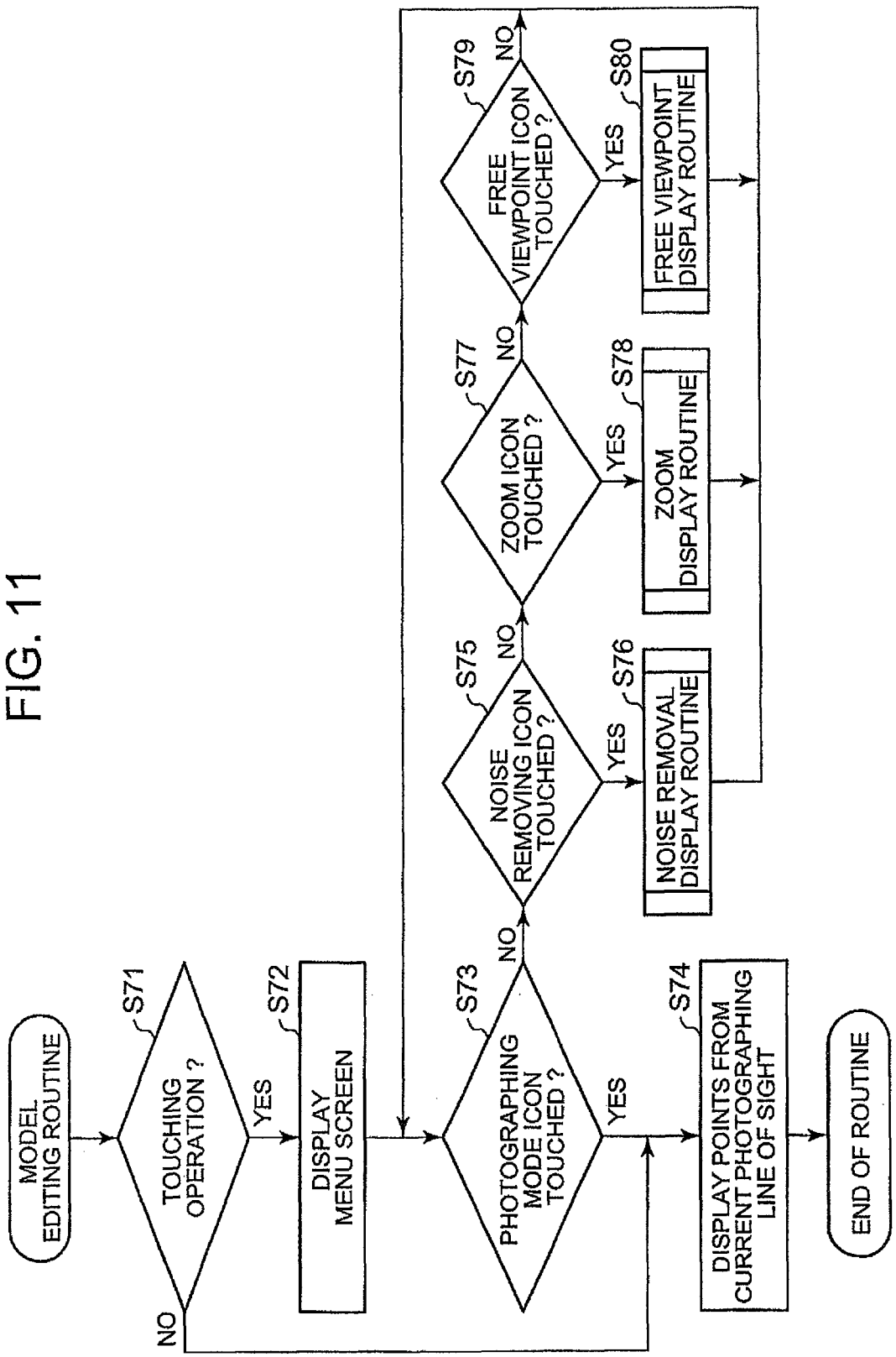
FIG. 11 is a flowchart illustrating one example of a model editing routine which is executed by a model editing unit.

After step S06 in FIG. 4, the model editing unit 144 in FIG. 5A executes a model editing routine of editing a 3D model group updated in step S06 as illustrated in FIG. 11 (step S07).

Figure 12A:
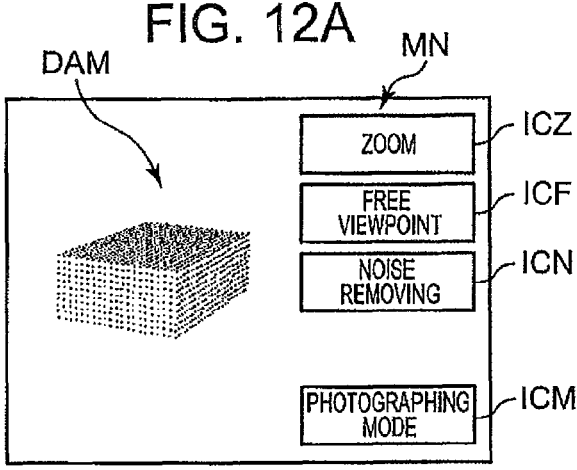
FIG. 12A is a diagram showing one example of a display menu.

When the model editing routine as illustrated in FIG. 11 starts, the model editing unit 144 determines whether or not a touching operation on the touch panel constituting the operation unit 131 in FIG. 3 has been performed based on the signal output from the operation unit 131 (step S71). When it is determined that the touching operation has been performed (step S71; Yes), the model editing unit 144 displays a display menu MN as shown in FIG. 12A on the display unit 103 in FIG. 1B (step S72). This display menu includes a zoom icon ICZ associated with a command to instruct enlargement or reduction of a 3D model to be displayed in a model display area DAM as shown in FIG. 12A, a free viewpoint icon ICF associated with a command to instruct to change the display viewpoint of a 3D model, a noise removing icon ICN associated with a command to instruct to remove noise from the 3D model, and a photographing mode icon ICM associated with a command to instruct to return the current 3D modeling mode to the normal photographing mode.

After step S72, the model editing unit 144 determines whether or not an icon displayed at the position where the touching operation has been performed (i.e., the icon touched by the user) is the photographing mode icon ICM based on the signal representing the coordinate values of the touched position output from the touch panel and the coordinate values of the position of each icon displayed on the display unit 103 (step S73).

When it is determined in step S71 that the touching operation has not been performed (step S71; No), or when it is determined in step S73 that the photographing mode icon ICM has been touched (step S73; Yes), the model editing unit 144 displays an image representing vertexes of the individual 3D models (hereinafter simply called "points") forming the 3D model group from the direction of the current photographing line of sight, in the model display area DAM of the display unit 103 (step S74). Then, the model editing unit 144 terminates the execution of the model editing routine.

When it is determined in step S73 that the photographing mode icon ICM has not been touched (step S73; No), the model editing unit 144 determines whether or not the noise removing icon ICN has been touched as in step S73 (step S75). When it is determined that the noise removing icon ICN has been touched (step S75; Yes), the model editing unit 144 removes noise from the 3D coordinates based on the noise removing level input from the touch panel, and then displays the vertexes of the noise-removed 3D coordinates on the display unit 103. That is, the model editing unit 144 executes a noise removal display routine as illustrated in FIG. 13A (step S76). Then, the model editing unit 144 returns to step S73 to repeat the sequence of processes.

Figure 12B:
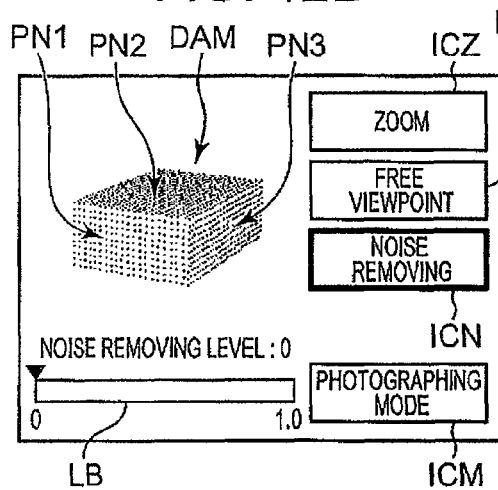
FIG. 12B is a diagram showing one example of points to be displayed when a noise removing level is "0"

When the execution of the noise removal display routine in FIG. 13A starts, the model editing unit 144 controls the display unit 103 to highlight the noise removing icon ICN as shown in FIG. 12B (step S81). The model editing unit 144 may reverse the display of the noise removing icon ICN. Next, the model editing unit 144 displays a level bar LB representing the noise removing level under the model display area DAM.

Next, the model editing unit 144 calculates the inner product of the vertex direction calculated in step S25 in FIG. 6A and the direction of the photographing line of sight determined by the rotation matrix R calculated in step S38 in FIG. 6B, with respect to each vertex of the 3D model group (step S83).

Figure 12C:
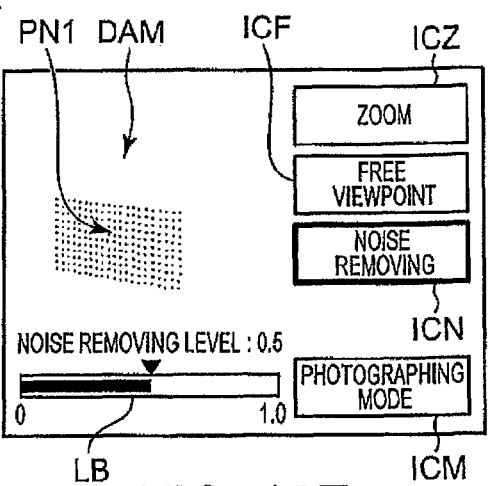
FIG. 12C is a diagram showing one example of points to be displayed when the noise removing level is "0.5"

Next, the model editing unit 144 acquires the noise removing level designated by the user (hereinafter simply called "designated level") based on the signal representing touched coordinate values output from the touch panel (step S84). When the coordinate values output from the touch panel represents the center position of the level bar displayed on the display unit 103, for example, the model editing unit 144 acquires an intermediate value of "0.5" between the minimum inner product value of "0" and the maximum inner product value of "1" as the designated level. Then, the model editing unit 144 displays the acquired designated level on the level bar LB as shown in FIG. 12C (step S85).

Next, the model editing unit 144 controls the display unit 103 to display vertexes having the vertex direction used in calculating an inner product value higher than the designated level acquired in step S84 (step S86). In addition, the model editing unit 144 controls the display unit 103 not to display vertexes having the vertex direction used in calculating an inner product value lower than the designated level (step S87). When the noise removing level is designated to the value "0.5", therefore, only the vertex of a polygon surface PN1 which is likely to face in the line of sight and unlikely to contain noise (i.e., the surface whose inner product value is equal to or greater than "0.5") among the vertexes of the polygon surfaces PN1 to PN3 as shown in FIG. 12B is displayed.

Thereafter, the model editing unit 144 determines whether or not another icon other than the noise removing icon ICN has been touched (step S88). When it is determined that another icon has not been touched (step S88; No), the model editing unit 144 returns to step S84 to repeat the sequence of processes.

When it is determined in step S88 that another icon has been touched (step S88; Yes), the model editing unit 144 removes the undisplayed vertex in step S87 from the models (step S89). Then, the model editing unit 144 stops highlighting the noise removing icon ICN on the display unit 103, and stops displaying the level bar on the display unit 103 (step S90), and then terminates the execution of the noise removal display routine.

According to the configurations, immediately upon photographing a subject, not only generated 3D model group is displayed, but also noise is removed from the 3D model group according to the noise removing level designated by the user's operation, and the noise-removed 3D model group is displayed. Accordingly, in addition to immediately confirming the generated 3D model group while photographing the subject multiple times, the user can also can easily and quickly designate the level of noise removal which is performed on the 3D model group based on the result of the confirmation, thus improving the usability of the imaging apparatus 100.

When it is determined in step S75 in FIG. 11 that the noise removing icon ICN has not been touched (step S75; No), the model editing unit 144 determines whether or not the zoom icon ICZ has been touched as in step S73 (step S77). When it is determined that the zoom icon ICZ has been touched (step S77; Yes), the model editing unit 144 changes the display size of the 3D coordinates based on the size input from the touch panel. That is, the model editing unit 144 executes a zoom display routine as illustrated in FIG. 13B (step S78), and then returns to step S73 to repeat the sequence of processes.

Figure 12D:
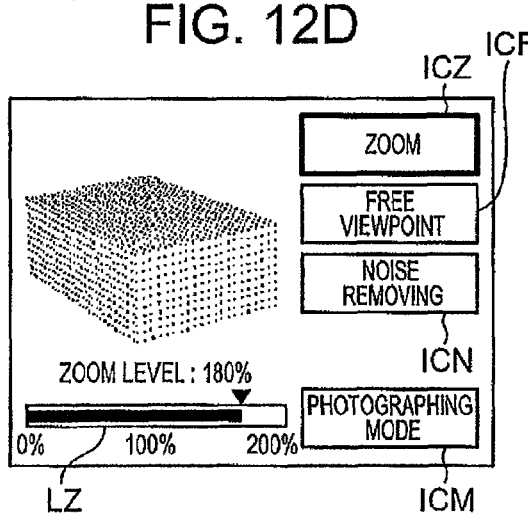
FIG. 12D is a diagram showing one example of points to be displayed when a zoom level is "180%"

When the execution of the zoom display routine in FIG. 13B starts, the model editing unit 144 controls the display unit 103 to highlight the zoom icon ICZ as shown in FIG. 12D (step S91). Then, the model editing unit 144 displays a size bar LZ representing the size under the model display area DAM.

Figure 12E:
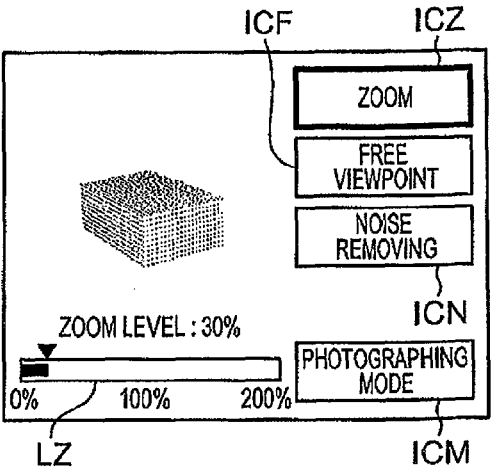
FIG. 12E is a diagram showing one example of points to be displayed when the zoom level is "30%"

Next, the model editing unit 144 acquires the display size of the 3D model designated by the user (hereinafter simply called "designated size") based on the signal representing the coordinate values of the touched position output from the touch panel (step S93). When the coordinate values of the touched position output from the touch panel represents the center position of the size bar LZ, for example, the model editing unit 144 acquires a default display size as the designated size (i.e., 100%). When the coordinate values of the touched position output from the touch panel represents the right-hand end of the size bar LZ, for example, the model editing unit 144 acquires twice the default display size (i.e., 200%) as the designated size. Then, the model editing unit 144 displays the acquired designated size on the size bar LZ as shown in FIG. 12D and FIG. 12E (step S94).

Next, the model editing unit 144 controls the display unit 103 to display the 3D model group with the designated size acquired in step S93 (step S95). That is, when the designated size is 180% of the default size as shown in FIG. 12D, the model editing unit 144 displays magnified 3D model group which are larger by 1.8 times than the 3D model group of the default size as shown in FIG. 12A. When the designated size is 30% of the default size as shown in FIG. 12E, the model editing unit 144 displays reduced 3D model group which are smaller by 0.3 times than the 3D model group of the default size.

Then, the model editing unit 144 determines whether or not another icon other than the zoom icon ICZ has been touched (step S96). When it is determined that another icon has not been touched (step S96; No), the model editing unit 144 returns to step S93 to repeat the sequence of processes.

When it is determined in step S96 that another icon has been touched (step S96; Yes), the model editing unit 144 stops highlighting the zoom icon ICZ and stops displaying the size bar LZ (step S97). Then, the model editing unit 144 terminates the execution of the zoom display routine.

When it is determined in step S77 in FIG. 11 that the zoom icon ICZ has not been touched (step S77; No), the model editing unit 144 determines whether or not the free viewpoint icon ICF has been touched as in step S73 (step S79). When it is determined that the free viewpoint icon ICF has not been touched (i.e., the touching operation on the free viewpoint icon ICF has not been performed) (step S79; No), the model editing unit 144 returns to step S73 to repeat the sequence of processes. When it is determined that the free viewpoint icon ICF has been touched (step S79; Yes), on the other hand, the model editing unit 144 specifies the direction of the line of sight directed toward the 3D model group of the subject from the touched position input from the touch panel, and displays the 3D model group from the specified direction of the line of sight on the display unit 103. That is, the model editing unit 144 executes a free viewpoint display routine as illustrated in FIG. 13C (step S80).

When the execution of the free viewpoint display routine in FIG. 13C starts, the model editing unit 144 controls the display unit 103 to highlight the free viewpoint icon ICF (step S101). Then, the model editing unit 144 detects the start position of the line of sight designated by the user based on the signal output from the touch panel, and acquires the line of sight directed toward the 3D model group from the detected start point (hereinafter simply called "designated line of sight") (step S102).

Next, the model editing unit 144 displays the 3D model group on the display unit 103 from the designated line of sight by rotating the 3D model group upward, downward, leftward or rightward according to the designated line of sight (step S103). Specifically, the model editing unit 144 calculates the rotation matrix that sets the designated line of sight to the line of sight of the user (i.e., direction opposite to the display direction of the display unit 103). Next, the model editing unit 144 converts the vertex coordinates of the 3D model group based on the calculated rotation matrix, and displays the converted 3D model group on the display unit 103.

Then, the model editing unit 144 determines whether or not another icon other than the free viewpoint icon ICF has been touched (step S104). When it is determined that another icon has not been touched (step S104; No), the model editing unit 144 returns to step S102 to repeat the sequence of processes.

When it is determined in step S104 that another icon other has been touched (step S104; Yes), the model editing unit 144 stops highlighting the free viewpoint icon ICF (step S105), and terminates the execution of the free viewpoint display routine.

After step S07 in FIG. 4, the image pickup controller 141 in FIG. 5A determines again whether or not the shutter button 109 in FIG. 1A is pressed (step S08). When it is determined that the shutter button 109 is pressed by user (step S08; Yes), the image pickup controller 141 increments the value of the number-of-shots counter by "1" (step S09). Then, the sequence of processes starting from step S04 is repeated.

When it is determined in step S08 that the shutter button 109 is not pressed (step S08; No), the image pickup controller 141 determines whether or not a termination event has occurred in a predetermined period as in step S03 (step S10). When it is determined that the termination event has not occurred in the predetermined period (step S10; No), the sequence of processes starting from step S07 is repeated.

When it is determined in step S10 that the termination event has occurred in the predetermined period (step S10; Yes), the 3D image generator 145 in FIG. 5A determines whether or not the mode of the imaging apparatus 100 is a polygon display mode of displaying a polygon image (step S11). When it is determined that the mode is not the polygon display mode (step S11; No), the 3D image generator 145 terminates the execution of the 3D image generating routine. When the imaging apparatus 100 is in the 3D modeling mode, it may be set in the polygon display mode. One example of the case where the imaging apparatus 100 is not set in the polygon display mode is when the imaging apparatus 100 is set in the normal photographing mode during the execution of the model editing routine in FIG. 11.

When it is determined in step S11 that the imaging apparatus 100 is set in the polygon display mode, the 3D image generator 145 generates a polygon image which is a 3D image from the points of the 3D model group using, for example, the alpha-shapes method (step S12). Specifically, the 3D image generator 145 creates polygon candidates by Delaunay triangulation using points. Next, the 3D image generator 145 places a sphere with a diameter α at each vertex defining each polygon candidate. The 3D image generator 145 regards a polygon candidate filled with spheres placed at the individual vertexes as valid, and regards a polygon candidate which is not filled with spheres as invalid.

Thereafter, the 3D image display controller 146 in FIG. 5A displays the generated polygon images (i.e., 3D images) of the subject on the display unit 103 (step S13), and then terminates the execution of the 3D image generating routine.

According to those configurations, it is determined in the second removing routine in FIG. 9B whether a point included in a 3D model is noise or not depending on whether this point is included in a 3D model generated using photographed images photographed at positions different from the photographing position for the photographed images used in generating the former 3D model. According to those configurations, a 3D image is generated based on a model from which a point determined as noise is removed. It is therefore possible to generate accurate 3D images of the subject.

According to those configurations, it is determined in the second removing routine in FIG. 9B whether a point included in a model is noise or not depending on whether a point contained in another model lies within a predetermined distance from the former point (i.e., in the near range). As the number of shootings increases, it is possible to more accurately determine noise. This is because that when the same point is shown in a plurality of photographed images, the 3D coordinates of the same point calculated based on the respective photographed images are not set apart by a distance longer than a distance generated by the error.

According to those configurations, since a point which is more likely to be noise than other points is extracted from points of corresponding a 3D model based on the difference between photographing positions of photographed images used in generating 3D models, and the extracted point is removed from the 3D model in the third removing routine in FIG. 9C, accurate 3D images can be generated. This is because that generally, when the difference between the photographing positions of a plurality of photographed images is small, it is more likely that a same point is shown in the plurality of photographed images as compared to the case where the difference is large, so that noise is less likely included in corresponding points of a plurality of 3D models generated from a plurality of photographed images. Another reason is that when the difference between the photographing positions of a plurality of photographed images is large, it is less likely that a same point is shown in the plurality of photographed images as compared with the case where the difference is small, so that it is more likely that noise is included in corresponding points of a plurality of 3D models.

Further, according to those configurations, when the difference between the direction of the photographing line of sight and the normal line of a polygon surface is larger than a predetermined value, the vertex of the polygon surface is regarded as noise and is removed from the 3D model in the first removing routine in FIG. 9A. Accordingly, accurate 3D images of the subject can be generated. This is because that as the difference between the normal direction of a polygon surface and the direction of the photographing line of sight becomes larger, the amount of information in the photographed images used in generating the polygon surface becomes smaller, so that it is easier for noise to appear on the polygon surface.

Further, according to those configurations, when the difference between the direction of the photographing line of sight and the direction of a vertex is large, the vertex is likely noise and is removed from the 3D model in the noise removal display routine in FIG. 13A. Accordingly, accurate 3D images of the subject can be generated. This is, as the difference between the direction of a vertex and the direction of the photographing line of sight becomes larger, the amount of information in the photographed images used in generating a plurality of polygon surfaces defining the vertex becomes smaller. Therefore, noise is more likely to appear on the polygon surfaces, so that it is likely that the vertexes defined by the polygon surfaces on which noise is likely to appear are noise.

<Modifications>

It has been described in the description of the embodiment that a vertex having adjoining polygon surfaces is regarded as noise and removed in the first removing routine in FIG. 9A when the inner product of the normal vectors of every adjoining polygon surface and the photographing line of sight is equal to or less than the threshold value TH_NP. However, the vertex may be regarded as noise and removed when the inner product of the normal vectors of at least one adjoining polygon surface and the photographing line of sight is equal to or less than the threshold value TH_NPX (see FIG. 14).

Figure 14:
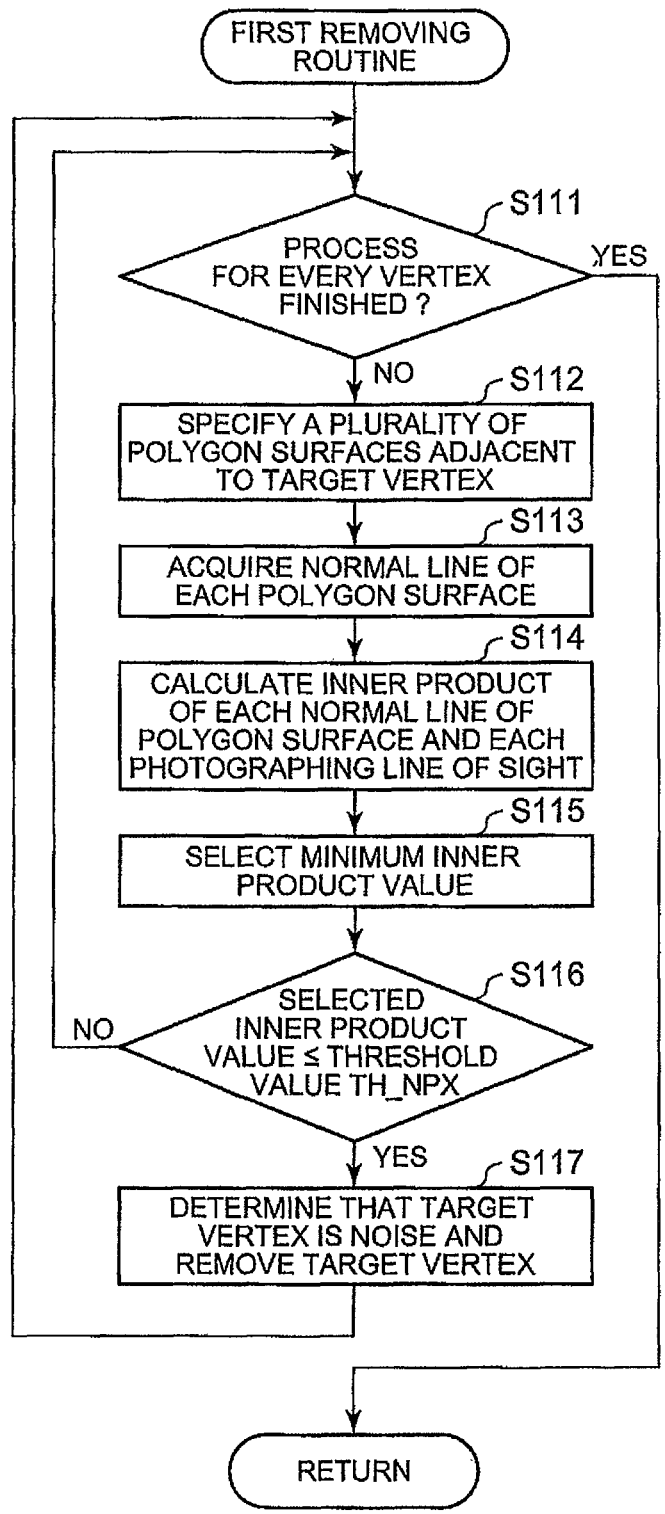
FIG. 14 is a flowchart illustrating one example of the first removing routine which is executed by a noise removing unit of a modification.

In this modification, when the execution of the first removing routine as illustrated in FIG. 14 starts, the noise removing unit 143d determines whether or not the execution of the following steps S112 to S117 has been completed for every vertex forming the current 3D model (step S111). When the execution of the process of step S112 and the like has not been completed for every vertex (step S111; No), the noise removing unit 143d specifies a plurality of polygon surfaces adjacent to a target vertex that is one of vertexes which are not to be subject to the process of step S112 and the like (step S112).

Next, the noise removing unit 143d acquires the normal vector of the specified polygon surface (step S113). Then, the noise removing unit 143d calculates the inner product of the normal vector of each polygon surface and the photographing line of sight predicted in the photographic-state predicting routine in FIG. 6B (step S114). Then, the noise removing unit 143d (noise determining unit) selects a minimum inner product value from the calculated inner product values (step S115), and determines whether or not the selected inner product value is equal to or less than the threshold value TH_NPX (step S116). When it is determined that the selected inner product value is greater than the threshold value TH_NPX (step S116; No), the noise removing unit 143d returns to step S111 to repeat the sequence of processes.

When it is determined in step S116 that the selected inner product value is equal to or less than the threshold value TH_NPX (step S116; Yes), the noise removing unit 143d (noise determining unit) determines the target vertex as noise, and removes the target vertex from the current 3D model (step S117). Then, the noise removing unit 143d repeats the sequence of processes starting from step S111.

According to those configurations, when the inner product of the normal vector of at least one of polygon surfaces adjacent to a certain vertex and the photographing line of sight is equal to or less than the threshold value TH_NPX, the vertex is removed as noise. Therefore, for example, it is possible to remove noise reliably as compared to the case where a certain vertex is removed as noise when the inner product of the normal vector of every polygon surface adjacent to the certain vertex and the photographing line of sight is equal to or less than the threshold value TH_NPX.

It is to be noted that an imaging apparatus previously equipped with the configurations according to the invention may be provided, and existing imaging apparatuses may become the imaging apparatus according to the invention by applying the program to the existing imaging apparatuses. In other words, the control program which allows the individual functional configurations of the imaging apparatus 100 exemplified as the foregoing embodiment may be adapted so that the program can be executed by a computer (CPU or the like) which controls an existing imaging apparatus to function as the imaging apparatus 100 according to the invention. In addition, the control method for the imaging apparatus according to the invention can be carried out with the imaging apparatus 100.

A method of distributing such a program is optional. For example, the program may be stored in a computer readable recording medium, such as a memory card, a CD-ROM (Compact Disk Read-Only Memory) or DVD (Digital Versatile Disk), for distribution. In addition, the program may be distributed via a communication medium such as the Internet.

Having described and illustrated the principles of this application by reference to embodiments, it should be apparent that the embodiments may be modified in arrangement and detail without departing from the principles disclosed herein and that it is intended that the application be construed as including all such modifications and variations insofar as they come within the spirit and scope of the subject matter disclosed herein.

What is claimed is:

1. A 3D model generating device comprising:
a processor configured to:
generate a 3D model of a subject using an image of the subject;
estimate a photographing direction of an imaging device at a time of photographing of the image based on a point forming the 3D model
select a plurality of 3D models having estimated photographing directions that differ by less than a predetermined amount and that have been generated from images with recent photographing times;
extract a predetermined number of 3D models from the plurality of selected 3D models in order of photographing time starting with a most recent photographing time, when a number of the plurality of selected 3D models exceeds the predetermined number; and
remove a 3D model generated by using an image that was photographed at an earlier photographing time than images used to generate the predetermined number of extracted 3D models.

2. A 3D model generating device comprising:
a processor configured to:
generate a 3D model of a subject using an image of the subject;

estimate a photographing direction of an imaging device at a time of photographing of the image based on a point forming the 3D model; and remove, from the 3D model, a polygon surface and a vertex of the removed polygon surface not used by another polygon surface, the vertex being a point forming the 3D model, when an inner product of a vector of the estimated photographing direction and a normal vector of the polygon surface having the vertex is equal to or less than a predetermined threshold value.

3. A 3D model generating device comprising:

a processor configured to:

generate a 3D model of a subject using an image of the subject;

estimate a photographing direction of an imaging device at a time of photographing of the image based on a point forming the 3D model; and remove a vertex from the 3D model, the vertex being a point forming the 3D model, when at least one of inner products of a vector of the estimated photographing direction and each normal vector of a plurality of polygon surfaces that share the vertex is equal to or less than a predetermined threshold value.

4. A 3D model generating method comprising:

generating a 3D model of a subject using an image of the subject;

estimating a photographing direction of an imaging device at a time of photographing of the image based on a point forming the 3D model;

selecting a plurality of 3D models having estimated photographing directions that differ by less than a predetermined amount and that have been generated from images with recent photographing times;

extracting a predetermined number of 3D models from the plurality of selected 3D models in order of photographing time starting with a most recent photographing time, when a number of the plurality of selected 3D models exceeds the predetermined number; and removing a 3D model generated by using an image that was photographed at an earlier photographing time than images used to generate the predetermined number of extracted 3D models.

5. A 3D model generating method comprising:

generating a 3D model of a subject using an image of the subject;

estimating a photographing direction of an imaging device at a time of photographing of the image based on a point forming the 3D model; and removing, from the 3D model, a polygon surface and a vertex of the removed polygon surface not used by another polygon surface, the vertex being a point forming the 3D model, when an inner product of a vector of the estimated photographing direction and a normal vector of the polygon surface having the vertex is equal to or less than a predetermined threshold value.

6. A 3D model generating method comprising:

generating a 3D model of a subject using an image of the subject;

estimating a photographing direction of an imaging device at a time of photographing of the image based on a point forming the 3D model; and removing a vertex from the 3D model, the vertex being a point forming the 3D model, when at least one of inner products of a vector of the estimated photographing direction and each normal vector of a plurality of polygon surfaces that share the vertex is equal to or less than a predetermined threshold value.

7. The 3D model generating device according to claim 3, wherein the processor is configured to remove the vertex from the 3D model when each of the inner products of the vector of the estimated photographing direction and each of the normal vectors of the plurality of polygon surfaces that share the vertex is equal to or less than the predetermined threshold value.

8. The 3D model generating method according to claim 6, wherein the vertex is removed from the 3D model when each of the inner products of the vector of the estimated photographing direction and each of the normal vectors of the plurality of polygon surfaces that share the vertex is equal to or less than the predetermined threshold value.

* * * * *